US00RE43743E

(19) United States
(12) Reissued Patent
Cho et al.

(10) Patent Number: US RE43,743 E
(45) Date of Reissued Patent: Oct. 16, 2012

(54) PROJECTION-TYPE IMAGE DISPLAY APPARATUS AND METHOD

(75) Inventors: Kun-ho Cho, Suwon-si (KR); Seung-Tae Jung, Seongnam-si (KR); Jang-hoon Yoo, Seoul (KR); Chul-woo Lee, Seongnam-Si (KR)

(73) Assignee: Samsung Electronics Co., Ltd., Suwon-Si (KR)

(21) Appl. No.: 11/106,732

(22) Filed: Apr. 15, 2005

Related U.S. Patent Documents

Reissue of:
(64) Patent No.: 6,547,398
Issued: Apr. 15, 2003
Appl. No.: 09/860,820
Filed: May 21, 2001

(30) Foreign Application Priority Data

Jun. 26, 2000 (KR) ..... 2000-35331

(51) Int. Cl.
*G03B 21/00* (2006.01)
*G03B 21/26* (2006.01)
*G03B 21/14* (2006.01)

(52) U.S. Cl. ..... 353/46; 353/31; 353/34; 353/84; 353/38; 353/101; 353/48; 353/98

(58) Field of Classification Search ..... 353/46, 353/48, 49, 50, 51, 98; 349/5, 7
See application file for complete search history.

(56) References Cited

U.S. PATENT DOCUMENTS 5,574,580 A 11/1996 Ansley
5,636,912 A * 6/1997 Lee et al. ..... 353/46
5,738,429 A 4/1998 Tagawa et al.
5,760,850 A 6/1998 Nakanishi et al.
5,822,025 A * 10/1998 Borel et al. ..... 349/5
5,894,359 A 4/1999 Suzuki et al.
5,897,190 A 4/1999 Takahashi (Continued)

FOREIGN PATENT DOCUMENTS

JP 2000-137191 5/2000

OTHER PUBLICATIONS

U.S. Office Action mailed Apr. 25, 2002, issued to parent patent application No. 6,547,398.

(Continued)

*Primary Examiner* — William C Dowling
(74) *Attorney, Agent, or Firm* — Staas & Halsey LLP

(57) ABSTRACT

A projection-type image display apparatus having a structure adapted so that the efficiency of the use of light and resolving power thereof can be enhanced. The projection-type image display apparatus includes a light source; a color separation unit separating incident rays according to predetermined wavelengths, and directing the separated rays at different angles; a lens array dividing the rays separated by the color separation unit into predetermined pixels; a driving portion driving the lens array to change the proceeding paths of the color rays; a polarizing beam splitter changing a proceeding path of incident rays depending on a direction of polarization; a reflection-type display device producing a color image using the rays entering via the polarizing beam splitter, and reflecting the color image toward the polarizing beam splitter; and a projection lens unit magnifying and projecting an incident image onto a screen. In addition, the projection-type image display apparatus may comprise. Alternative designs include a transmission-type display device in place of the reflection-type display device and a deflector changing the proceeding paths of the individual color rays separated by the color separation unit instead of the driving portion.

31 Claims, 20 Drawing Sheets

U.S. PATENT DOCUMENTS 5,969,832 A * 10/1999 Nakanishi et al. ..... 359/15
6,020,940 A * 2/2000 Ishikawa et al. ..... 349/8
6,070,982 A 6/2000 Aritake
6,219,110 B1 * 4/2001 Ishikawa et al. ..... 348/759
6,231,189 B1 5/2001 Colucci et al.
6,243,055 B1 * 6/2001 Fergason ..... 345/32
6,330,112 B1 12/2001 Kaise et al.
6,347,014 B1 2/2002 Hayashi et al.
6,457,828 B1 10/2002 Hayashi
6,540,362 B1 * 4/2003 Janssen ..... 353/31
6,547,398 B2 * 4/2003 Cho et al. ..... 353/31
6,817,718 B2 * 11/2004 Katoh ..... 353/31

OTHER PUBLICATIONS

U.S. Office Action mailed Aug. 27, 2002, issued to parent patent application No. 6,547,398.

U.S. Notice of Allowance mailed Dec. 5, 2002, issued to parent patent application No. 6,547,398.

* cited by examiner

PROJECTION-TYPE IMAGE DISPLAY APPARATUS AND METHOD

Matter enclosed in heavy brackets [ ] appears in the original patent but forms no part of this reissue specification; matter printed in italics indicates the additions made by reissue.

CROSS-REFERENCE TO RELATED APPLICATION

This application claims the benefit of Korean Patent Application No. 00-35331 filed Jun. 26, 2000 in the Korean Industrial Property Office, the disclosure of which is incorporated herein by reference.

BACKGROUND OF THE INVENTION

1. Field of the Invention

The present invention relates to a projection-type image display apparatus and method providing an image by focusing an image formed by display devices on a screen using light emitted from a light source, and more particularly, to a projection-type image display apparatus having a structure adapted so that the efficiency of the use of light and resolving power thereof can be enhanced, and method of providing the same.

2. Description of the Related Art

Referring to FIG. 1, a conventional projection-type image display apparatus comprises a light source 10 generating and emitting light, first and second dichroic mirrors 42 and 44 separating an incident white light beam into red, blue, and green beams, first, second, and third transmissive display devices 51, 53, and 55 forming respective images corresponding to the separated colors, a color prism 60 combining the images formed by the first, second, and third display devices 51, 53, and 55, a screen 80, and a projection lens unit 70 magnifying and projecting the combined image onto the screen 80.

Here, the projection-type image display apparatus further comprises a fly's eye lens array 20 installed in the optical path between the light source 10 and the first dichroic mirror 42 mixing incident rays so that uniform beams can enter the first, second, and third display devices 51, 53, and 55, a polarizer allowing only one polarized component to pass therethrough, and a converging lens 41 converging the beam having passed through the polarizer 31.

Since the conventional projection-type image display apparatus configured as described above employs 3 sheets of display devices producing a color image, the optical structure is complex. Further, since one polarized component is used as an effective beam using a polarizer, and the beam having passed through the polarizer is divided into three beams of three respective paths by the first and second dichroic mirrors, there is a problem in which the light utilization efficiency of the apparatus is low.

SUMMARY OF THE INVENTION

Accordingly, it is an object of the present invention to provide a projection-type image display apparatus in which first and second dichroic mirrors and a reflecting mirror disposed to neighbor each other are used to direct separated color rays toward one direction while the separated rays have different converging angles, and both separated p-polarized rays and s-polarized rays are used to form an image by employing at least one polarizing beam splitter so that the efficiency of the use of light and resolving power thereof can be enhanced.

Additional objects and advantages of the invention will be set forth in part in the description which follows and, in part, will be obvious from the description, or may be learned by practice of the invention.

The foregoing objects of the present invention are achieved by providing a projection-type image display apparatus including: a light source generating and emitting light; a color separation unit separating incident rays according to predetermined ranges of wavelengths, and directing the separated rays at angles different from each other; a lens array dividing the rays separated by the color separation unit into predetermined pixels and converging the rays of pixels individually; a driving portion driving the lens array to change the proceeding paths of the color rays focused on the lens array; a polarizing beam splitter changing a proceeding path of incident rays depending on a direction of polarization by passing first polarized rays of the incident rays, and reflecting second polarized rays; a reflection-type display device producing a color image using the first and/or second polarized rays having passed through and/or having been reflected from the polarizing beam splitter, and reflecting the color image toward the polarizing beam splitter; a lens unit provided in the optical path between the lens array and the display device converging and projecting incident rays onto the display device; and a projection lens unit magnifying and projecting the image formed by the display device and entering via the polarizing beam splitter onto a screen.

The above objects of the present invention may also be achieved by providing a projection-type image display apparatus including: a light source generating and emitting light; a color separation unit separating incident rays according to predetermined ranges of wavelengths, and directing the separated rays at angles different from each other; a deflector changing the proceeding paths of the individual color rays separated by the color separation unit; a lens array dividing the rays separated by the color separation unit into predetermined pixels and converging the rays of pixels individually; a polarizing beam splitter changing a proceeding path of incident rays depending on a direction of polarization by passing first polarized rays of the incident rays, and reflecting second polarized rays; a reflection-type display device producing a color image using the rays entering via the polarizing beam splitter, and reflecting the color image toward the polarizing beam splitter; and a projection lens unit magnifying and projecting the image formed by the display device and entering via the polarizing beam splitter onto a screen.

The above objects are further achieved by providing a projection-type image display apparatus including: a light source generating and emitting light; a color separation unit separating incident rays according to predetermined ranges of wavelengths, and directing the separated rays at angles different from each other; a lens array dividing the rays separated by the color separation unit into predetermined pixels and converging the rays of pixels individually; a driving portion driving the lens array to change the proceeding paths of the color rays focused on the lens array; a relay lens converging the rays having passed through the lens array; a reflection-type display device producing a color image using the rays having passed through the relay lens, and reflecting the color image in a direction different from that of incident rays; and a projection lens unit magnifying and projecting the image reflected from the display device onto a screen.

The above objects are further achieved by providing a projection-type image display apparatus including: a light source generating and emitting light; a color separation unit separating incident rays according to predetermined ranges of wavelengths, and directing the separated rays at angles different from each other; a lens array dividing the rays separated by the color separation unit into predetermined pixels and converging the rays of pixels individually; a driving portion driving the lens array to change the proceeding paths of the rays focused on the lens array; a reflection-type display device selectively passing the rays having passed through the lens array to form an image; and a projection lens unit magnifying and projecting the image formed by the display device onto a screen.

The above objects are further achieved by providing a projection-type image display apparatus including: a light source generating and emitting light; a color separation unit separating incident rays according to predetermined ranges of wavelengths, and directing the separated rays at angles different from each other; a first polarizing beam splitter reflecting a first polarized rays of the rays separated by the color separation unit to direct the first polarized rays toward a first path, and passing a second polarized rays thereof to direct the second polarized rays toward a second path; first and second lens arrays provided in the first and second path, respectively, dividing the rays separated by the color separation unit into predetermined pixels and converging the rays of pixels individually; first and second driving portions driving the first and second lens arrays to change the proceeding paths of the rays focused on the first and second lens arrays; first and second transmission-type display devices selectively passing the respective rays having passed through the first and second lens arrays to form respective images; a second polarizing beam splitter combining the images formed by the first and second display devices and directing the combined image to one path; and a projection lens unit magnifying and projecting the image combined by the second polarizing beam splitter onto a screen to form a magnified image on the screen.

BRIEF DESCRIPTION OF THE DRAWINGS

These and other objects and advantages of the present invention will become apparent and more readily appreciated from the following description of the preferred embodiments, taken in conjunction with the accompanying drawings of which.

DESCRIPTION OF THE PREFERRED EMBODIMENTS

Figure 1:
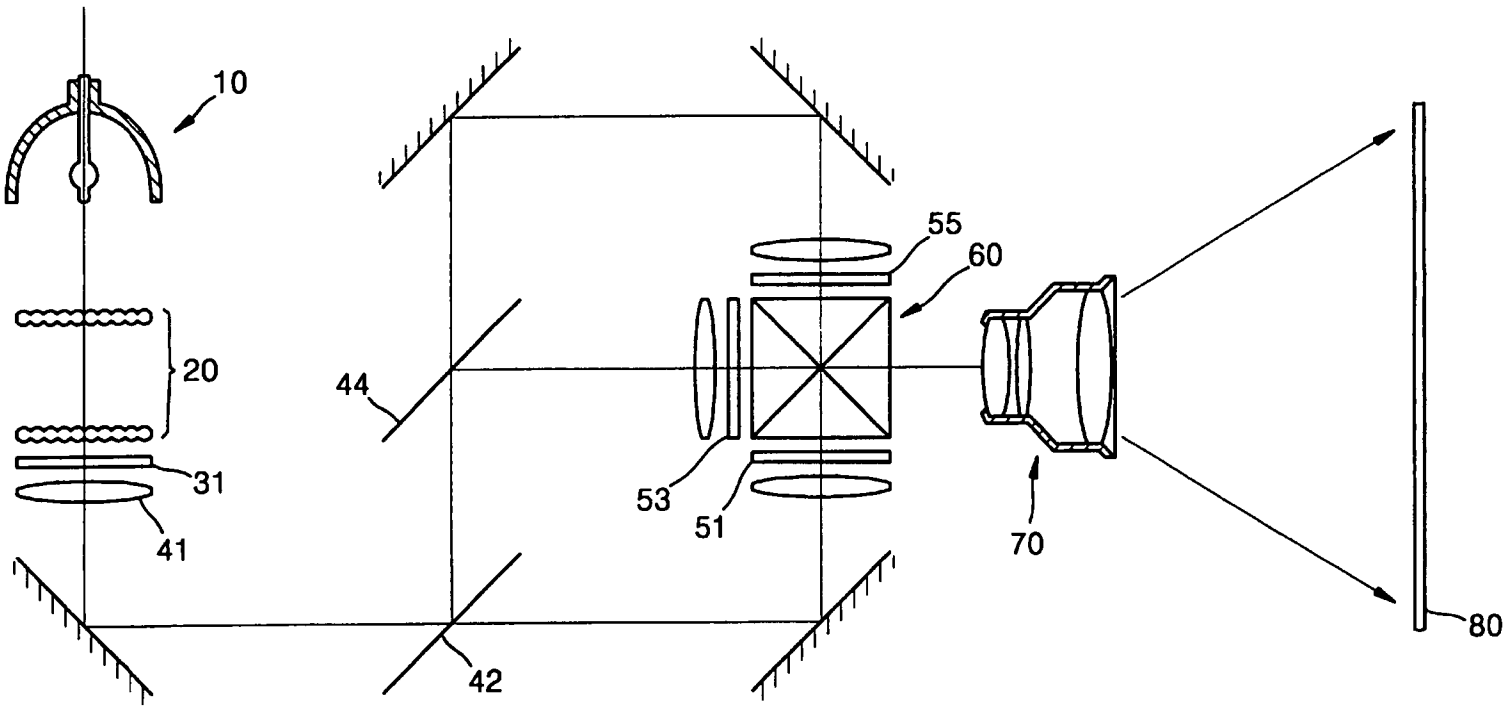
FIG. 1 (PRIOR ART)
FIG. 1 is a schematic diagram illustrating an optical layout of a conventional projection-type image display apparatus.
Figure 2:
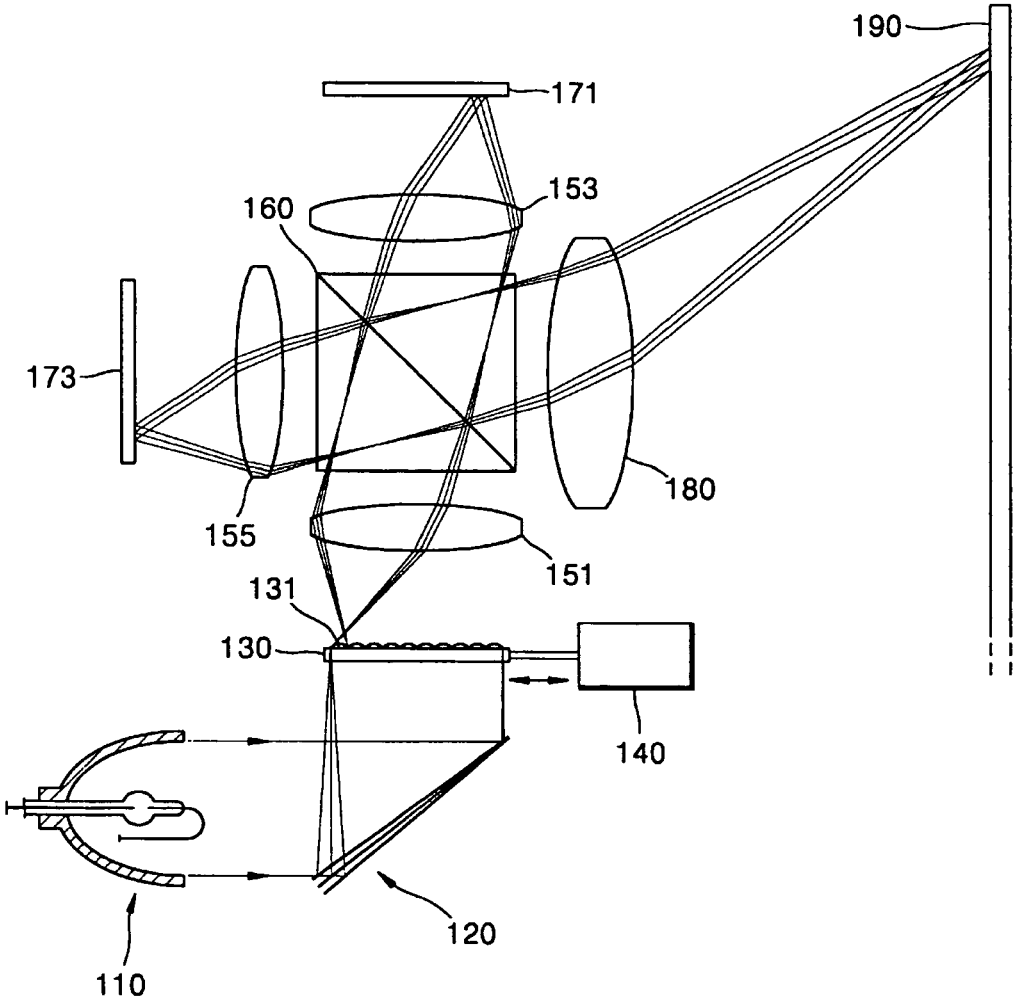
FIG. 2 is a schematic diagram illustrating an optical layout of a projection-type image display apparatus according to an embodiment of the present invention.
Figure 3:
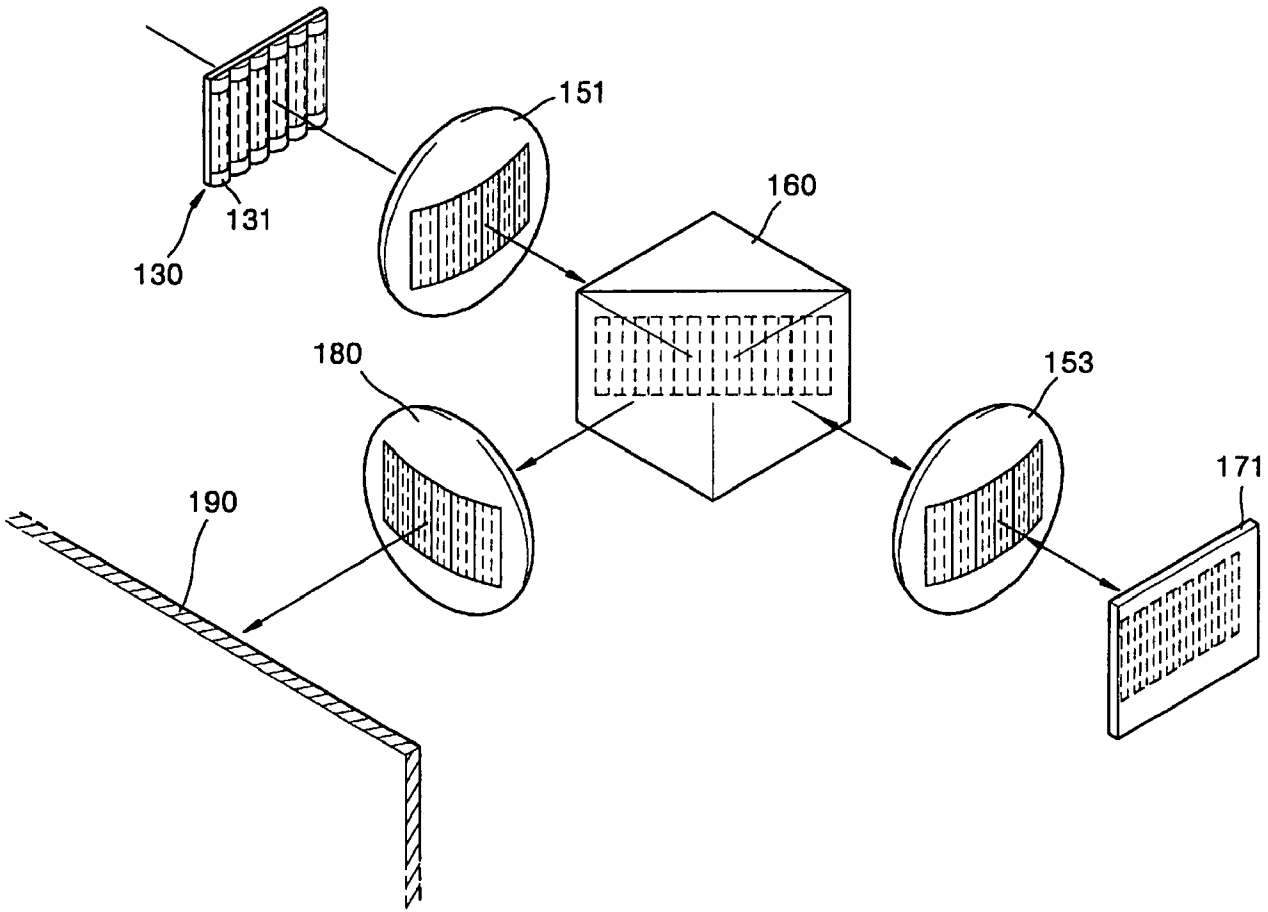
FIG. 3 is a schematic perspective view illustrating an essential portion of the apparatus shown in FIG. 2.

Referring to FIGS. 2 and 3, a projection-type image display apparatus comprises a light source 110 generating light and emitting the generated light in a direction, a color separation unit 120, a lens array 130, a driving portion 140 driving the lens array 130 in a direction perpendicular to the optic axis of incident rays, and a polarizing beam splitter 160 separating an incident ray according to polarization, reflection-type display devices 171 and 173 transforming incident rays into color-imaged rays, a screen 190, and a projection lens unit 180 magnifying and projecting the images formed by the display devices 171 and 173 onto the screen 190.

The light source 110 is comprised of a lamp such as a xenon lamp, and a halogen lamp, and a reflecting mirror provided at a side of the lamp directing light emitted from the lamp in a direction.

Figure 4:
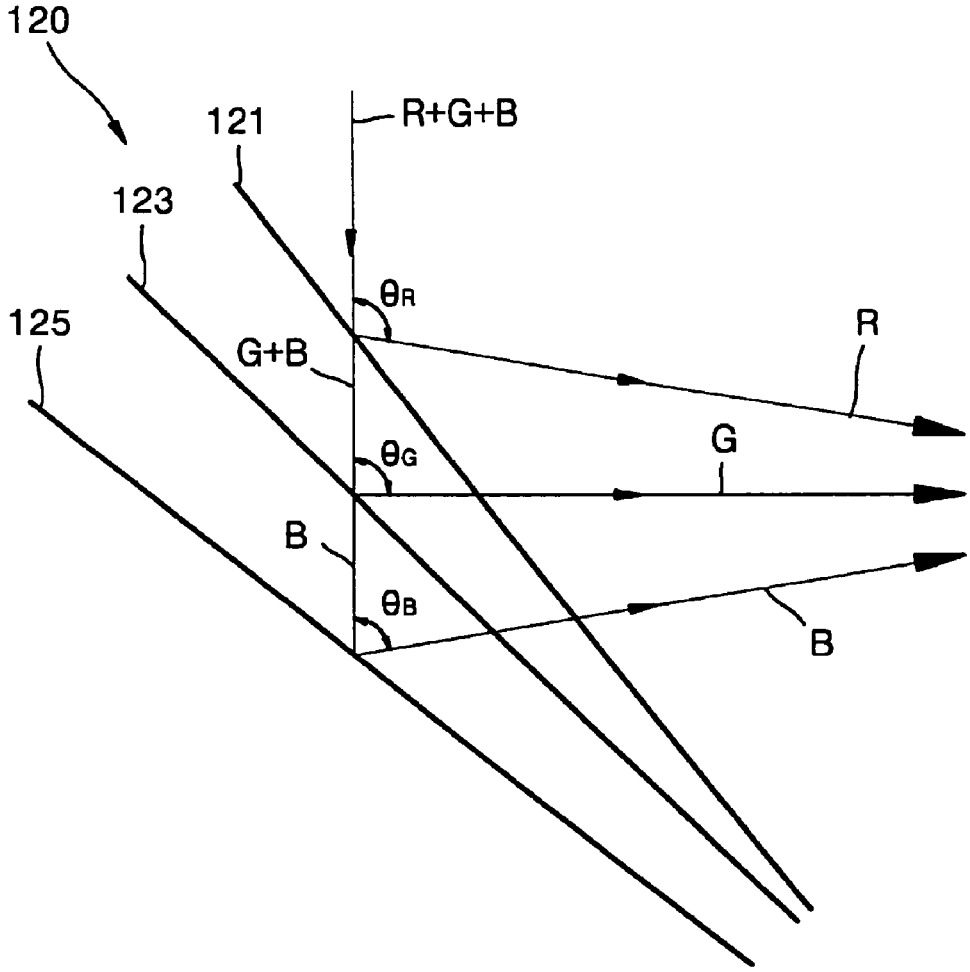
FIG. 4 is a diagram illustrating an optical layout of the color separation unit of FIG. 2.

The color separation unit 120 separates an incident beam into beams of predetermined wavelength ranges, and causes the separated beams to travel at different angles from each other. Referring to FIG. 4, the color separation unit 120 includes first and second dichroic mirrors 121 and 123 disposed to be slant at different angles with respect to the optic axis of an incident beam, and a reflecting mirror 125.

The first dichroic mirror 121 reflects the beam (R) of a first wavelength range of an incident white light beam composed of combinations of red (R), green (G), and blue (B) rays at a first angle $\theta_R$ with respect to the optical axis of the incident beam, and passes the beams (G) and (B) of other wavelength ranges. The second dichroic mirror 123 reflects the beam (G)

of a second wavelength range of the beam having passed through the first dichroic mirror 121 at a second angle $\theta_G$ with respect to the optical axis, and passes the other beam (B) of a third wavelength range. In addition, the reflecting mirror 125 reflects the beam (B) of a third wavelength range having passed through the first and second dichroic mirrors 121 and 123 at a third angle $\theta_B$ with respect to the optical axis.

Here, it is preferable that the first, second, and third angles $\theta_R$, $\theta_G$ and $\theta_B$ are determined to satisfy Equation (1) of inequality so that the beams (R) and (B) of the first and third wavelength ranges which are reflected from the color separation unit 120 can be converged with the beam (G) positioned at the center.

$$\theta_R > \theta_G > \theta_B \quad (1)$$

Here, the fact that the first, second, and third wavelength ranges are respectively set to be red (R), green (G), and blue (B) is intended only for the purpose of an example, and therefore the first wavelength range may be set to be another color, i.e., green (G), or blue (B).

Figure 5:
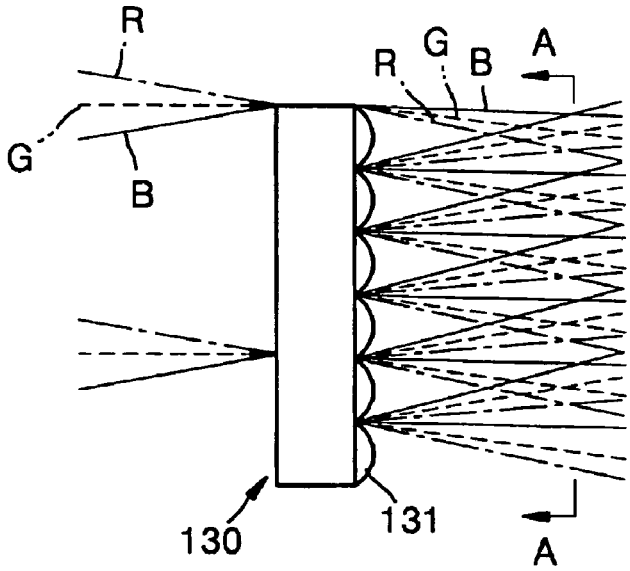
FIG. 5 is a diagram illustrating an optical layout of the lens array of FIG. 2.
Figure 6:
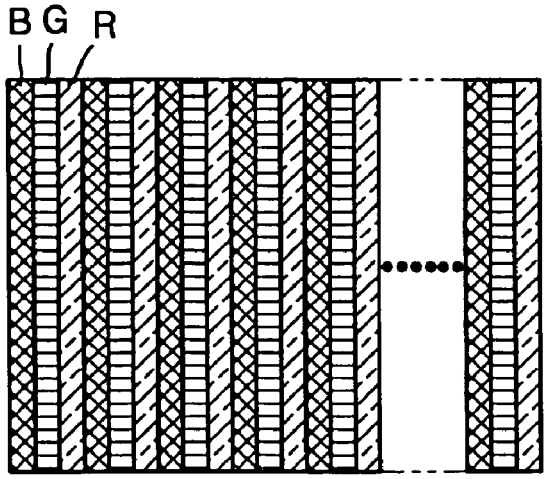
FIG. 6 is a sectional view illustrating the pattern of an image having passed through the lens array and taken along line A—A of FIG. 5.

Referring to FIGS. 2, 3, and 5, the lens array 130 divides beams (R), (G), and (B) of the first, second, and third wavelength ranges by the color separation unit 120 into a predetermined number of pixel rays, respectively, and converges the divided pixel rays individually. To this end, it is preferable that the lens array 130 is a cylindrical lens array in which a plurality of cylindrical lenses 131 each having widths corresponding to the widths of pixels constituting the reflection-type display devices 171 and 173 are disposed to neighbor each other. Therefore, as shown in FIG. 6 illustrating a sectional view taken along line A—A of FIG. 5, the beam having passed through the lens array 130 has color stripes disposed to neighbor each other in the repeating sequence of blue (B), green (G), and red (R) colors. The color stripes are moved a minute distance in a direction perpendicular to the optical axis according to the operation of the driving portion 140. Therefore, red (R), green (G), and blue (B) color beams can be alternately projected onto individual pixels of the display devices 171 and 173.

Figure 7:
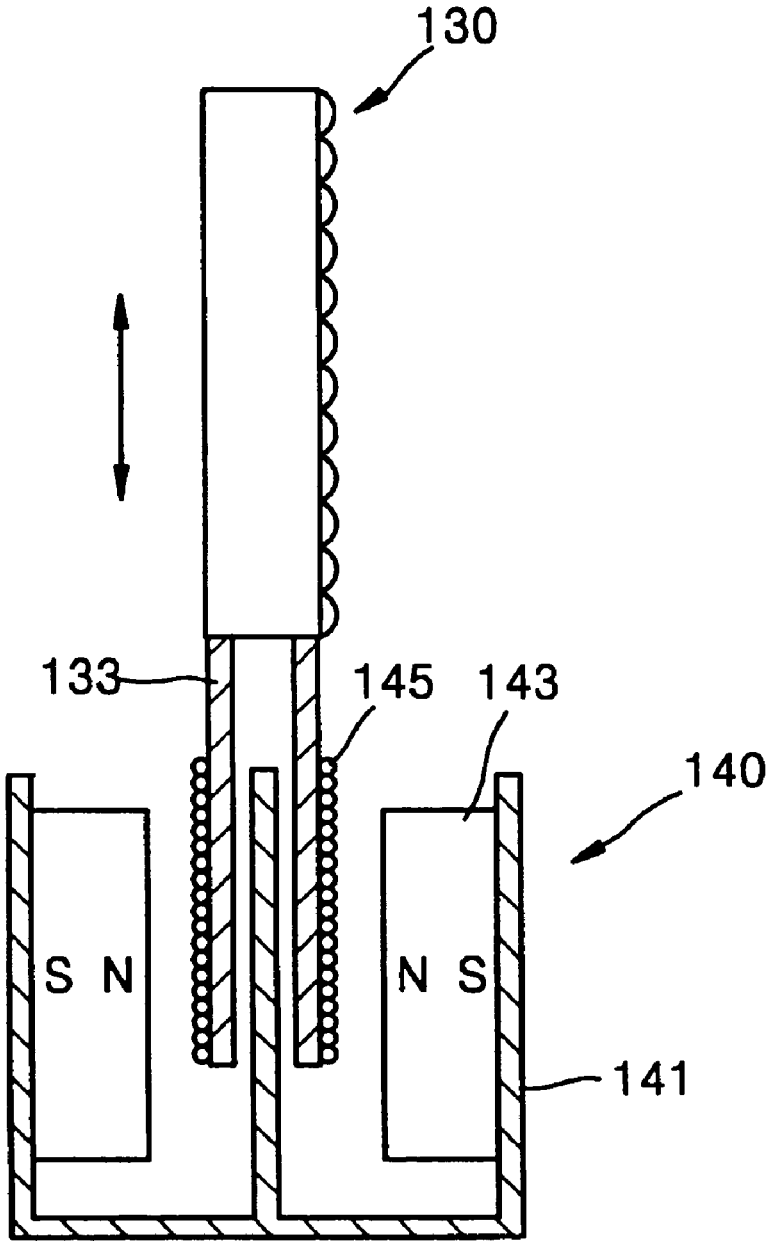
FIG. 7 is a schematic diagram illustrating a driving portion driving the lens array.

Referring to FIG. 7, the driving portion 140 drives the lens array 130 linearly in the directions of a double-headed arrow shown in FIG. 7, and is comprised of a yoke member 141 having internal and external yoke portions which are integrally formed and forming a magnetic circuit, a magnet 143 provided on the inner sides of the external yoke portions of yoke member 141, a coil member 145 wound around a bobbin 133 having a form extended from the lens array 130 so that the coil member 145 can face the magnets 143. Here, the direction of the magnetic field lines of the magnets 143 and the winding direction of the coil member 145 are determined so that the direction of an electromagnetic force between the coil member 145 and the magnets 143 can be the directions of a double-headed arrow shown in FIG. 7. The driving portion 140 moves the lens array 130 by a unit length which is ⅓ or less than ⅓ the width of the cylindrical lens 131 so that the beams of the first, second, and third wavelength ranges can alternately enter respective pixels constituting the display devices 171 and 173. In addition, it should be understood that the driving portion 140 may be composed of a piezoelectric driver operated according to the piezoelectric effect other than the previously described structure of a voice coil motor.

Figure 8A:
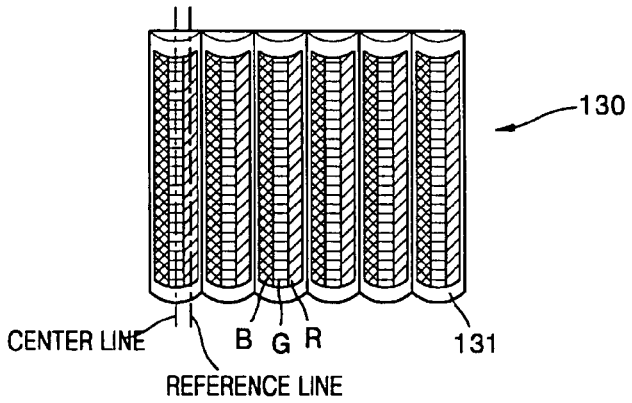
FIGS. 8A, 9A, and 10A are diagrams illustrating positions of divided color stripes, which are changed according to the positional change of the lens array.
Figure 8B:
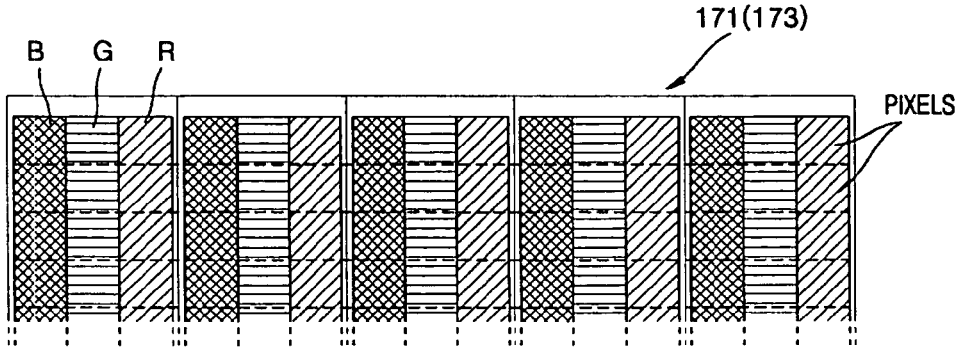
FIGS. 8B, 9B, and 10B are diagrams illustrating positions of color images formed by a display device when the lens array is disposed as shown in FIGS. 8A, 9A, and 10A, respectively.
Figure 9A:
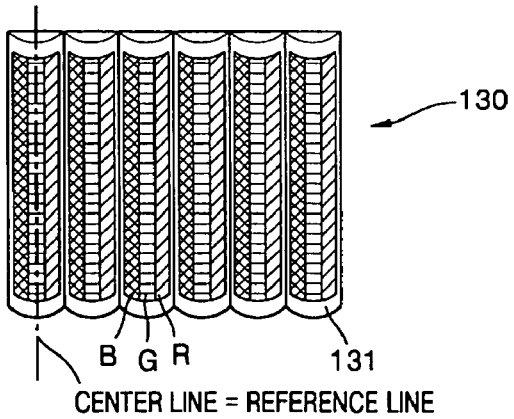
Figure 9B:
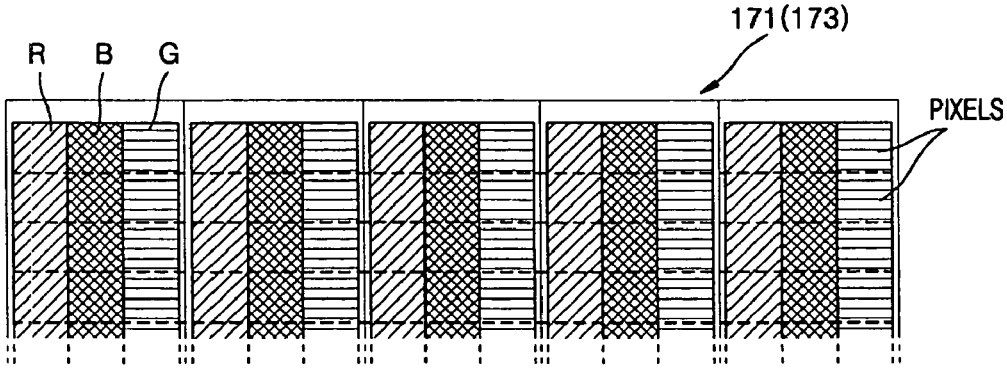
Figure 10A:
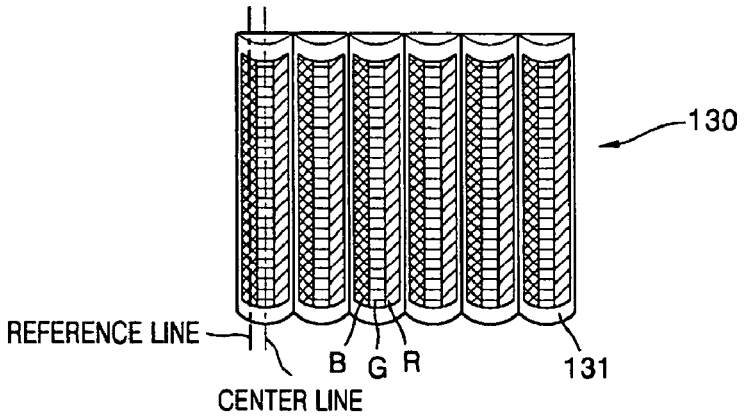
Figure 10B:
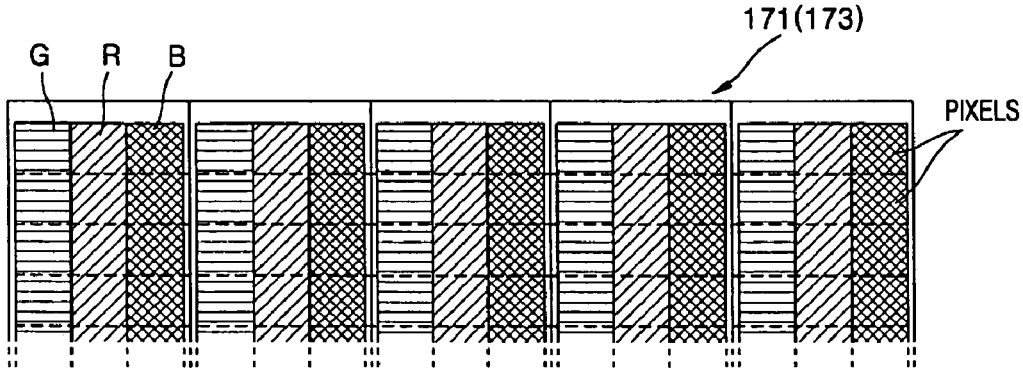

FIGS. 8A, 9A, and 10A are diagrams illustrating positions of divided color stripes, which are changed according to the positional change of the lens array. In addition, FIGS. 8B, 9B, and 10B are diagrams illustrating positions of color images formed by a display device when the lens array is disposed as shown in FIGS. 8A, 9A, and 10A, respectively. The center line shown in FIGS. 8A, 9A, and 10A is a line showing the center of one cylindrical lens 131 constituting the lens array 130, the position of the center line varies when the lens array 130 is operated by the driving portion 140 (FIG. 7). On the other hand, the reference line shown in FIGS. 8A, 9A, and 10A is a line forming one datum of a predetermined optical system, for example, the display device 171 or 173, and the position of the reference line is fixed without reference to the operation of the lens array 130.

First, when reviewing FIGS. 8A, 9A, and 10A, the optical arrangement of the separated beams (R), (G), and (B) of the first, second, and third wavelength ranges on the lens array 130 is not changed. In addition, when the lens array 130 is operated so that the center line may be positioned on the left side of the reference line, as shown in FIG. 8A, the rays of the first, second, and third wavelength ranges having passed through the lens array 130 enter the display devices 171 and 173 in the order of blue (B), green (G), and red (R) stripes, as shown in FIG. 8B. When the lens array 130 is operated so that the center line may be positioned on the reference line, as shown in FIG. 9A, the rays having passed through the lens array 130 enter the display devices 171 and 173 in the order of red (R), blue (B), and green (G) stripes, as shown in FIG. 9B. Finally, when the lens array 130 is operated so that the center line may be positioned on the right side of the reference line, as shown in FIG. 10A, the rays having passed through the lens array 130 enter the display devices 171 and 173 in the order of green (G), red (R), and blue (B) stripes, as shown in FIG. 10B.

Therefore, when the lens array 130 is operated in a direction perpendicular to the optical axis according to the three steps, as described above, three color rays of color stripes which have been divided by the color separation unit 120 and have passed the lens array 130 sequentially enter one pixel of the display devices 171 and 173. Therefore, when the display device 171 is driven in accordance with the operation of the lens array 130 operated by the driving portion 140, it is possible to produce a necessary color in each pixel, and therefore to produce a full color image.

The polarizing beam splitter 160 is provided in the optical path between the lens array 130 and the display devices 171 and 173, and changes a preceding path of an incident beam by selectively passing or reflecting the incident beam according to the polarized direction of the incident beam. For example, the polarizing beam splitter 160 passes a first polarized incident beam, and reflects a second polarized incident beam whose polarized direction is orthogonal with respect to that of the first polarized beam.

The display devices 171 and 173 produce color-imaged rays from the first and/or second polarized rays having passed through and/or having been reflected from the polarizing beam splitter 160, and reflects the color-image rays to the polarizing beam splitter 160. FIG. 2 shows an example of a projection-type image display apparatus provided with both the first reflection-type display device 171 transforming the rays having passed through the polarizing beam splitter 160 into color-imaged rays, and the second reflection-type display device 173 transforming the rays reflected from the polarizing beam splitter 160 into color-imaged rays. It is preferable that each of the first and second display devices 171 and 173 is composed of a ferroelectric liquid crystal display device exhibiting a faster response speed than a conventional liquid crystal display device.

In addition, a projection-type image display apparatus according to an embodiment of the present invention is provided with a lens unit disposed in the optical paths between the lens array 130 and the display devices 171 and 173 condensing and projecting the incident rays onto the display devices 171 and 173. Referring to FIG. 2, the lens unit includes a first converging lens 151 provided in the optical path between the lens array 130 and the polarizing beam splitter 160 converging the rays having passed through the lens array 130, and second converging lenses 153 and 155 provided in the optical paths between the polarizing beam splitter 160 and the first and second display devices 171 and 173, respectively converging respective incident beams.

Figure 11:
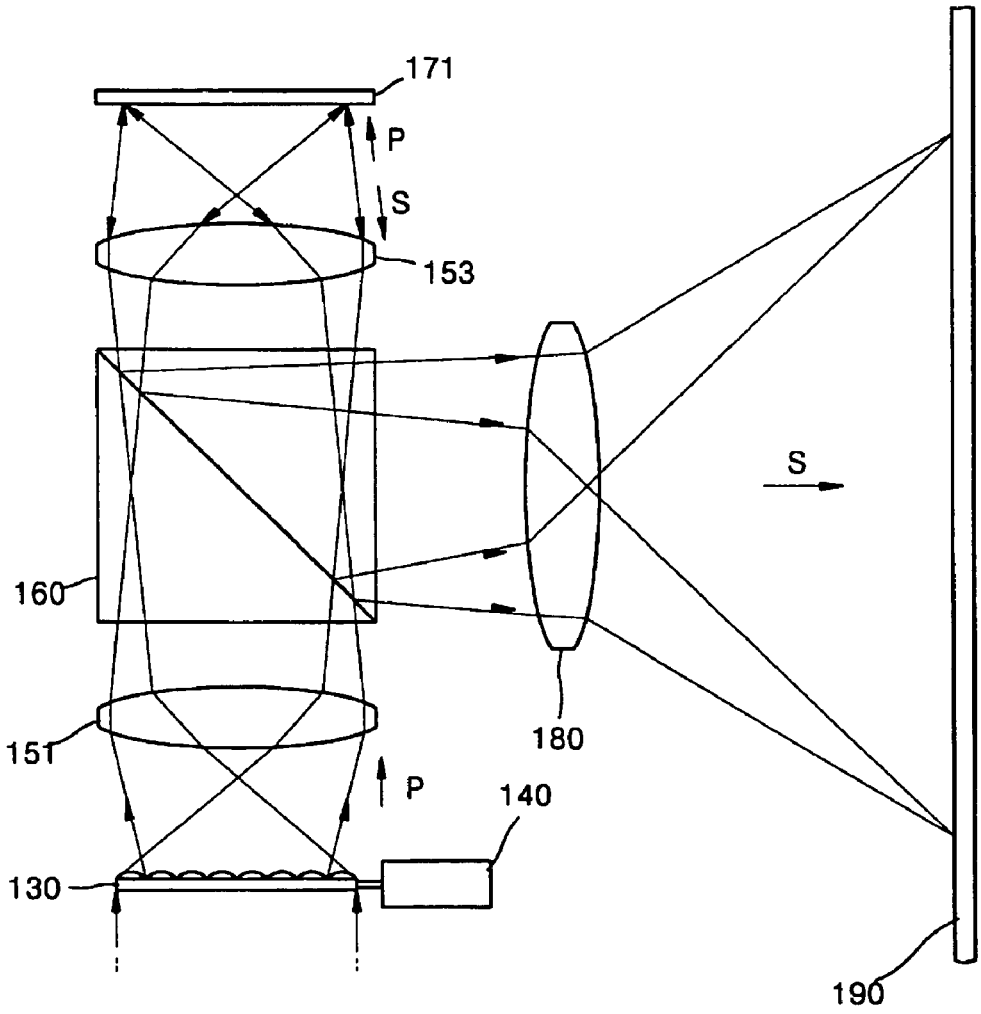
FIG. 11 is a schematic diagram illustrating the operation of the projection-type image display apparatus shown in FIGS. 2 and 3 when one polarized beam enters the lens array.

FIG. 11 is a schematic diagram illustrating the operation of the projection-type image display apparatus shown in FIG. 2 when the first polarized beam, i.e., a p-polarized beam enters the lens array. In this case, the display device is provided with only the first display device 171, and the second converging lens 153 is provided only in the optical path between the polarizing beam splitter 160 and the first display device 171.

Referring to FIG. 11, a p-polarized beam divided into color stripes while passing through the lens array 130 is converged by the first converging lens 151, and the converged beam passes through the polarizing beam splitter 160. The beam, having passed through the polarizing beam splitter 160, is converged by the second converging lens 153, and the converged beam enters the first display device 171. The first display device 171 changes a direction of polarization of the rays being reflected from its pixels forming an image from a p-polarization to an s-polarization, and reflects the s-polarized rays toward the polarizing beam splitter 160. The reflected rays pass through the second converging lens 153, and then s-polarized rays of the reflected rays corresponding to an image are reflected from the polarizing beam splitter 160, and are magnified and projected onto the screen 190 by the projection lens unit 180.

Here, it should be understood that when an incident beam entering from the light source is an s-polarized beam, an image can be produced by providing the second converging lens 155 and the second display device 173 instead of the second converging lens 153 and the first display device 171. In addition, the same effect can be produced by changing the transmission and reflection characteristics of the polarizing beam splitter 160 for polarized beams without changing the second converging lens 153 and the first display device 171.

Figure 12:
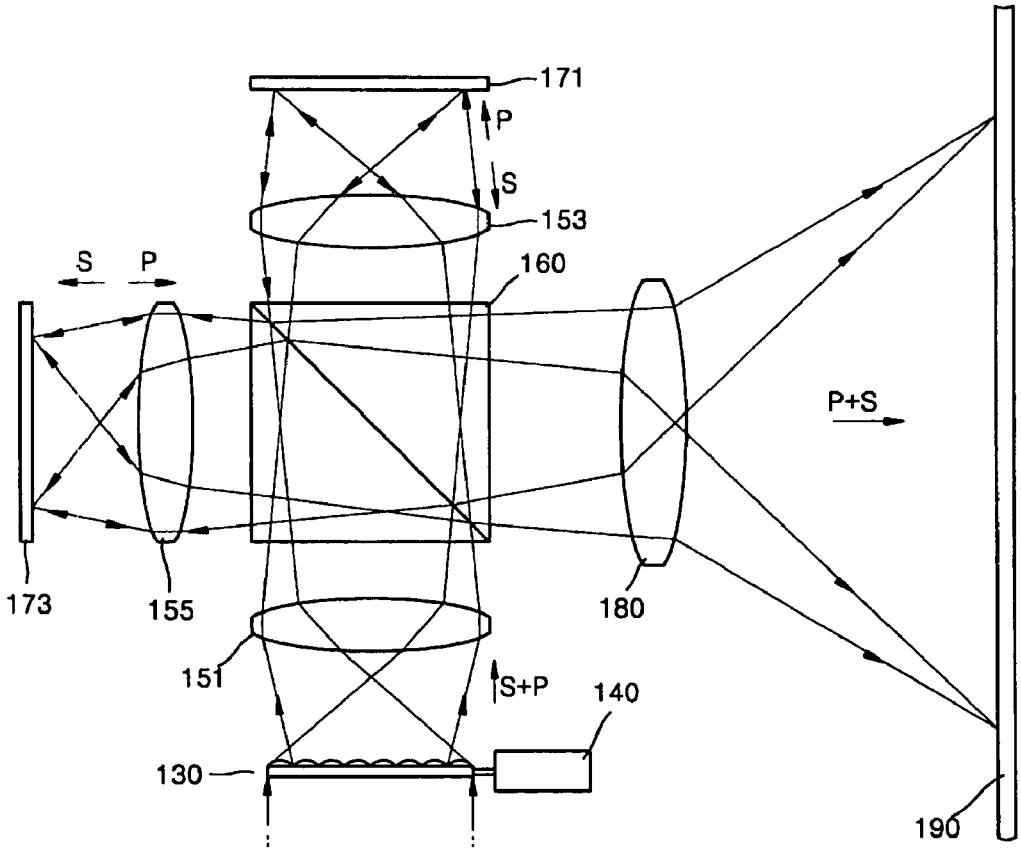
FIG. 12 is a schematic diagram illustrating the operation of the projection-type image display apparatus shown in FIGS. 2 and 3 when different polarized beams enter the lens array.

FIG. 12 is a schematic diagram illustrating the operation of the projection-type image display apparatus shown in FIG. 2 when the first and second polarized rays in a mixed state enter the lens array. In this case, the second converging lenses 153 and 155, and the first and second display devices 171 and 173 are provided along two respective optical paths. Referring to FIG. 12, the first and second polarized rays (S+P) divided into the color stripes while passing through the lens array 130 are converged by the first converging lens 151, and enter the polarizing beam splitter 160. The polarizing beam splitter 160 passes the first polarized rays, i.e., the p-polarized rays, and reflects the second polarized rays, i.e., the s-polarized rays. The first display device 171 is provided in the proceeding path of the first polarized rays, converts the rays reflected from individual pixels forming an image into second polarized rays, and reflects the rays toward the polarizing beam splitter 160. In addition, the second display device 173 is provided in the proceeding path of the second polarized rays, converts the rays reflected from individual pixels forming an image into first polarized rays, and reflects the rays toward the polarizing beam splitter 160. The polarizing beam splitter 160 reflects the second polarized rays forming an image, which enter from the first display device 171, and passes the first polarized rays forming an image, which enter from the second display device 173 so that the rays from the first and second display devices 171 and 173 can be directed toward the screen 190. In this case, since both the first and second polarized rays entering from the light source 110 are used as effective rays to form an image, there is an advantage in that the efficiency of the use of light can be higher than that of the case configured as shown in FIG. 11.

In addition, as shown in FIG. 12, in the case that an image is formed by selectively using the first and second display devices 171 and 173 which are operated independently of each other according to the directions of polarization, a 3-D image can be seen when a user wears polarizing glasses to see the 3-D image.

Figure 13:
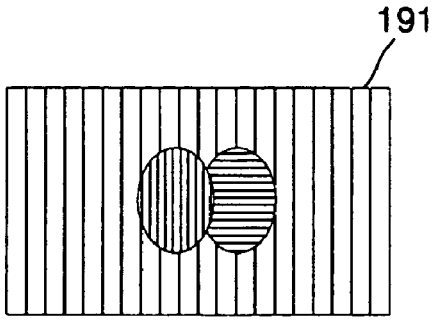
FIG. 13 is a diagram illustrating a 3-D image focused on the screen in FIG. 12, in which an s-polarized beam image and a p-polarized beam image overlap.

FIG. 13 is a diagram illustrating a 3-D image 191 focused on the screen in FIG. 12, in which an s-polarized beam image and a p-polarized beam image overlap. Here, a second polarized beam image (an s-polarized beam image) formed by the first display device 171 and projected by the projection lens unit 180, and a first polarized beam image (a p-polarized beam image) formed by the second display device 173 and projected by the projection lens unit 180 constitute a left-eye image and a right-eye image for forming an image of a frame, respectively.

Figure 14:
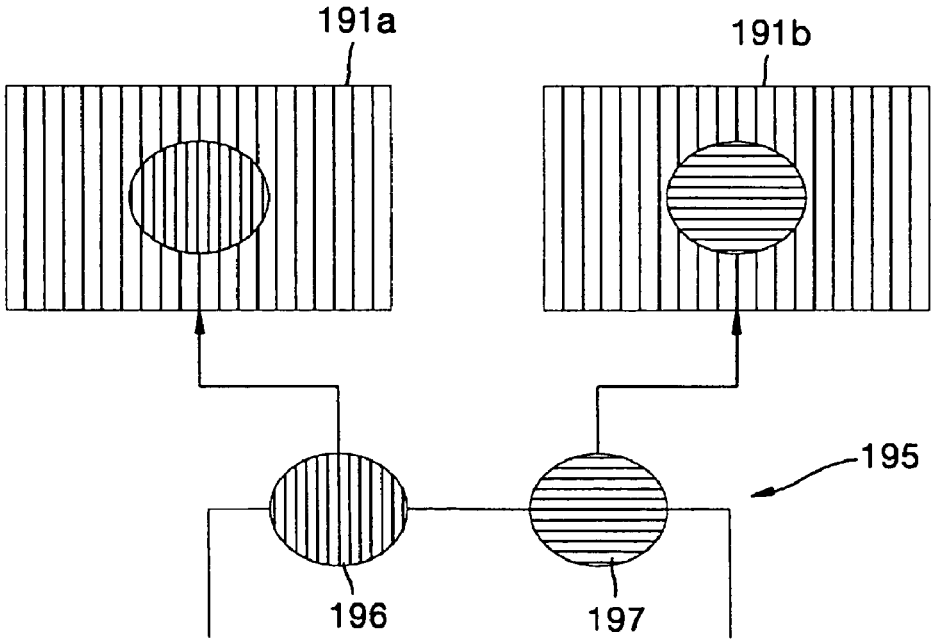
FIG. 14 is a diagram illustrating a left-eye image and a right-eye image into which an overlapped image is separated by polarizing eyeglasses.

As shown in FIG. 14, since a left-eye image 191a and a right-eye image 191b are separated when an image focused onto the screen 190 is seen via polarizing eyeglasses which has a left-eye lens 196 having a direction of polarization to allow a p-polarized beam image to pass therethrough, and a right-eye lens 197 having a direction of polarization to allow an s-polarized beam image to pass therethrough, a 3-D image can be seen.

Figure 15:
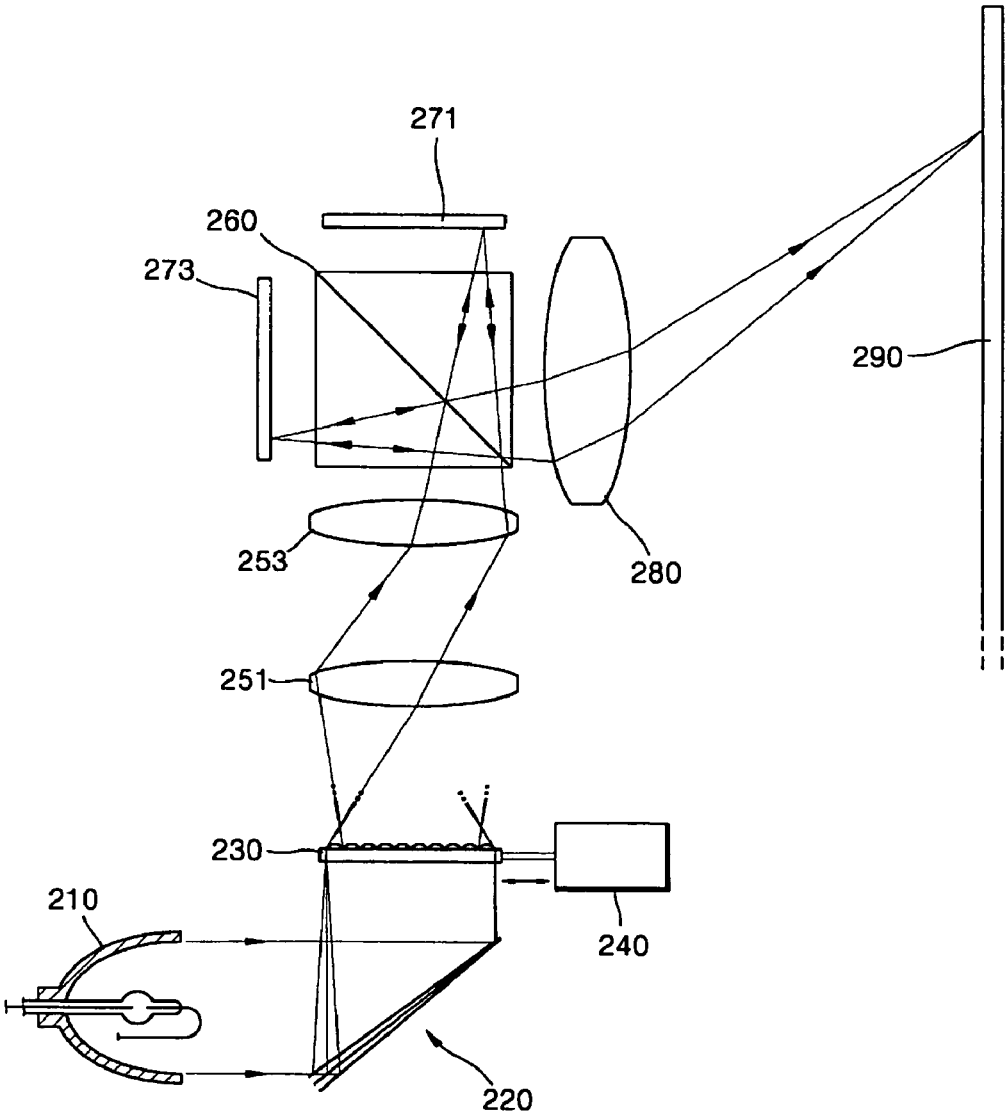
FIG. 15 is a schematic diagram illustrating an optical layout of a projection-type image display apparatus according to another embodiment of the present invention.

Referring to FIG. 15, a projection-type image display apparatus according to another embodiment of the present invention comprises a light source 210 emitting light in one direction, a color separation unit 220, a lens array 230 operated by a driving portion 240 in a direction perpendicular to the optic axis thereof, a lens unit, a polarizing beam splitter 260, first and second reflection-type display devices 271 and 273, and a projection lens unit 280 magnifying and projecting the images formed by the display devices 271 and 273 onto a screen 290.

The projection-type image display apparatus is characterized in that an optical layout of first and second converging lenses 251 and 253 constituting the lens unit is changed, and since the other optical members have substantially the same structures and functions as the optical members of the same names described in connection with the embodiment of FIG. 2, detailed descriptions thereof will be omitted.

The first and second converging lenses 251 and 253 are sequentially provided along the optical path between the lens array 230 and the polarizing beam splitter 260, and converge incident rays. When the first and second converging lenses 251 and 253 are provided as described above, since an optical distance between the polarizing beam splitter 260 and the first and second display devices 271 and 273 can be short, there are advantages in that optical design of a projection-type image display apparatus can be easily performed, and, in addition, the optical component of the apparatus can be compacted more than the first embodiment by employing only one second converging lens.

Figure 16:
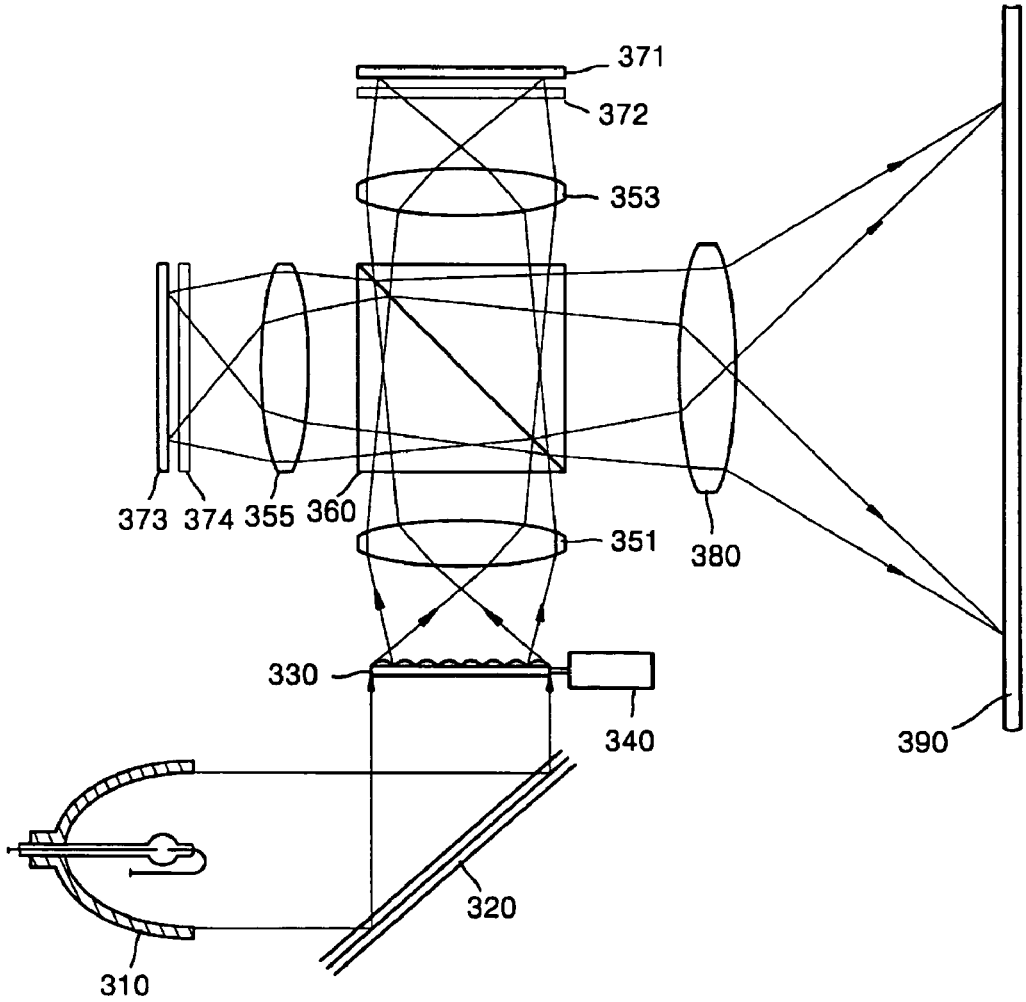
FIG. 16 is a schematic diagram illustrating an optical layout of a projection-type image display apparatus according to yet another embodiment of the present invention.
Figure 17:
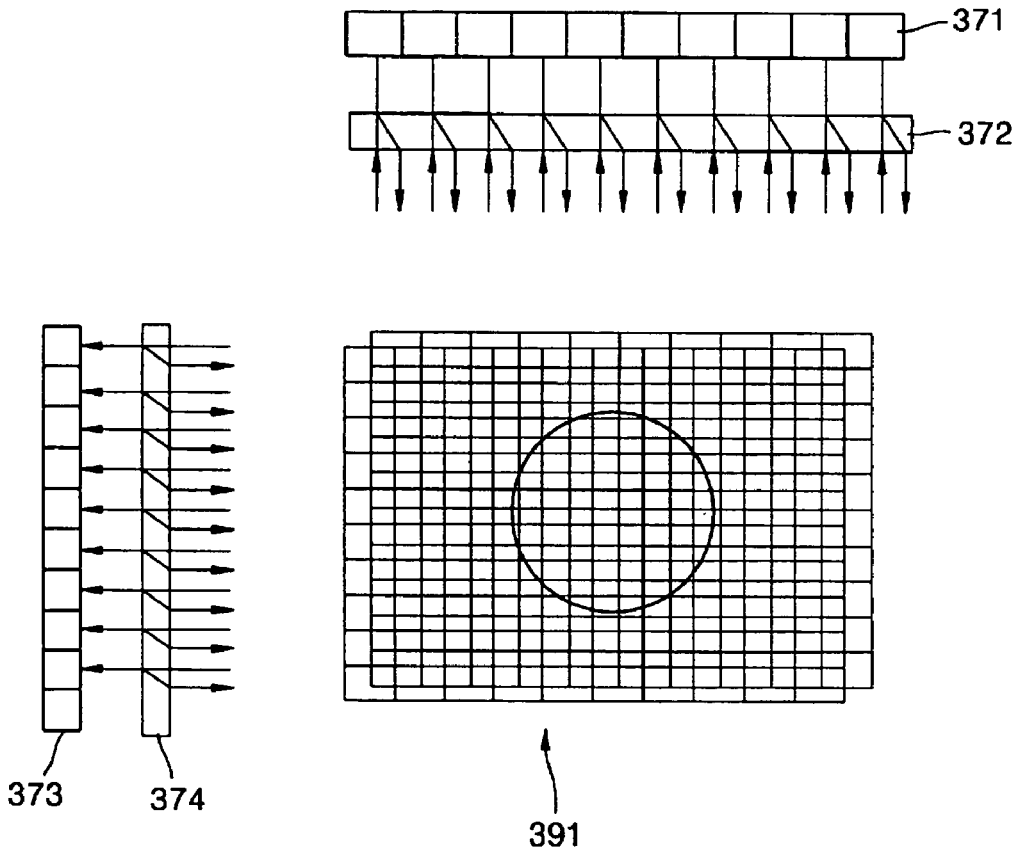
FIG. 17 is a view diagram illustrating an overlapped image formed by images which are formed by first and second display devices of FIG. 16 and pass through first and second birefringent plates.

Referring FIGS. 16 and 17, a projection-type image display apparatus according to another embodiment of the present invention comprises a light source 310 emitting light in one direction, a color separation unit 320, a lens array 330 operated by a driving portion 340 in a direction perpendicular to the optical axis thereof, lens units 351, 353, and 355, a polarizing beam splitter 360, first and second reflection-type display devices 371 and 373, first and second birefringent plates 372 and 374, and a projection lens unit 380 magnifying and projecting the images formed by the display devices 371 and 373 onto a screen 390.

The projection-type image display apparatus is characterized in that the first and second birefringent plates 372 and 374 are provided in optical paths, since the other optical members have substantially the same structures and functions as the optical members of the same names described in connection with the embodiment of FIG. 2, detailed descriptions thereof will be omitted.

The first birefringent plate 372 is provided in the optical path between the first display device 371 and the polarizing beam splitter 360, and causes the rays reflected from the first display device 371 to displace a predetermined portion of the width of a pixel with respect to incident rays. In addition, the second birefringent plate 374 is provided in the optical path between the second display device 373 and the polarizing beam splitter 360, and causes the rays reflected from the second display device 373 to displace a predetermined portion of the height of a pixel with respect to incident rays. Here, it is preferable that the first and second birefringent plates 372 and 374 are disposed so that differently polarized two types of rays projected onto the screen 390 can be displaced ½ the width and height of a pixel in directions orthogonal to incident rays. In the case that the projection-type image display apparatus is configured as described above, since a color image can be projected onto the screen 390 with the area of every pixel on the screen divided into 4 equal portions, there is an advantage in that a high-resolution image can be achieved.

Figure 18:
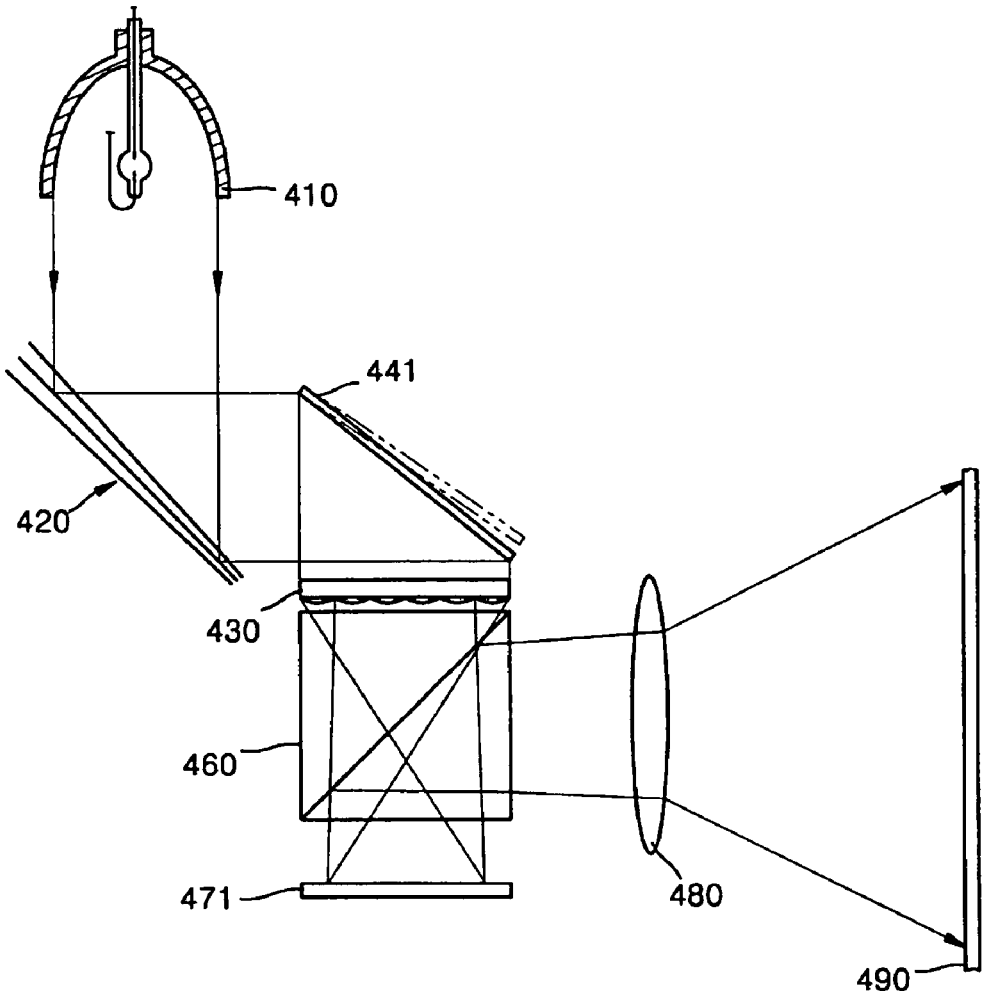
FIGS. 18 and 19 are schematic diagrams respectively illustrating an optical layout of a projection-type image display apparatus according to yet another embodiment of the present invention.
Figure 19:
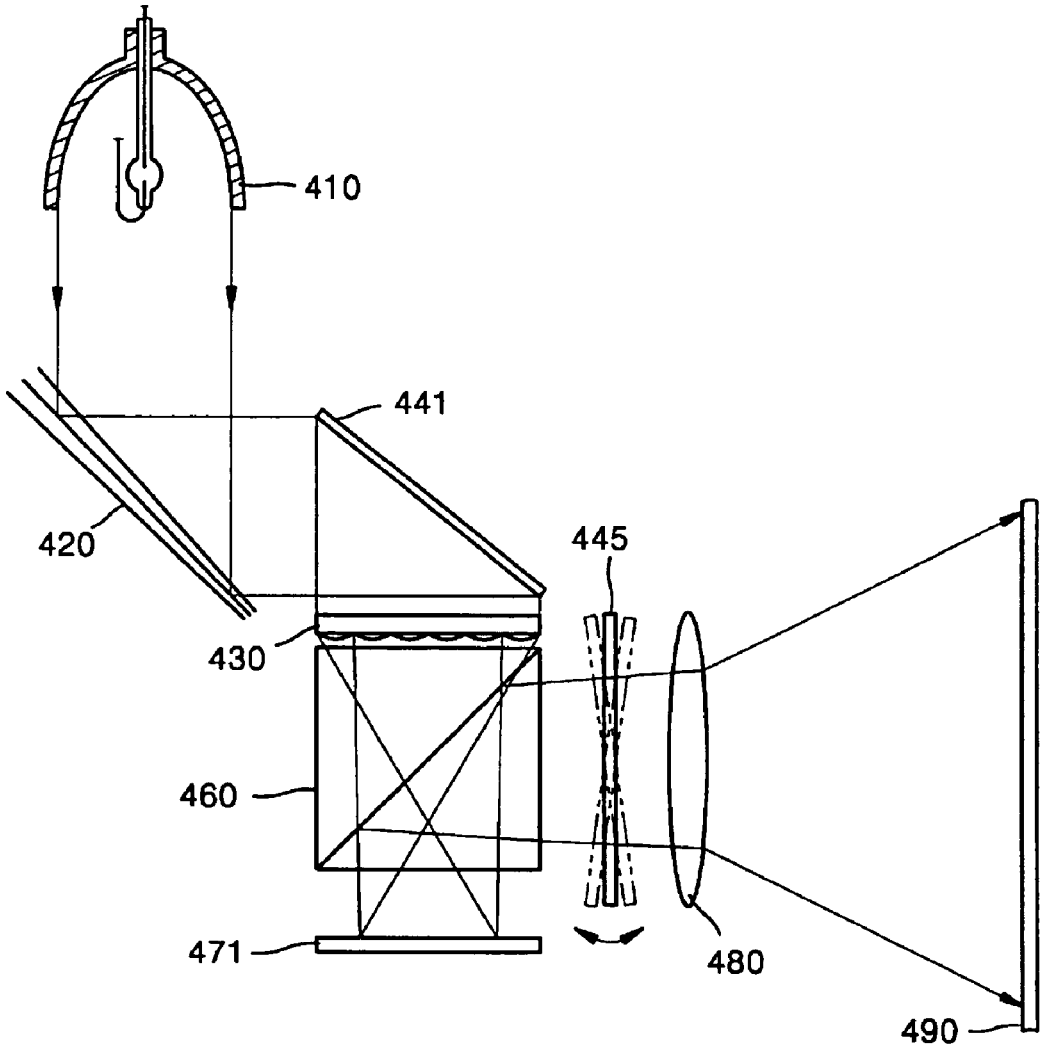

Referring to FIGS. 18 and 19, a projection-type image display apparatus according to another embodiment of the present invention comprises a light source 410, a color separation unit 420, a deflector, a lens array 430 dividing the beams separated by the color separation unit 420 into a predetermined number of pixel rays, a polarizing beam splitter 460 changing the proceeding path of an incident beam depending on a direction of polarization of the incident beam, a reflection-type display device 471, and a projection lens unit 480 magnifying and projecting the images entering from the display device 271 onto a screen 490.

The projection-type image display apparatus configured as above is characterized in that beams separated by the color separation unit 420 are deflected and therefore the proceeding paths of the beams are changed without operating the lens array 430 so that the beams of the first, second, and third wavelength ranges can sequentially enter into respective pixels of the display device 471.

Referring to FIG. 18, the deflector is composed of a deflecting mirror 441 which is provided to be pivotable in the optical path between the color separation unit 420 and the lens array 430 changing an angle of reflection of an incident ray. In addition, as shown in FIG. 19, it is possible that the deflector is composed of a deflecting plate 445 which is provided to be pivotable in the optical path between the polarizing beam splitter 460 and the screen 490 changing an angle of refraction of an incident ray.

Figure 20:
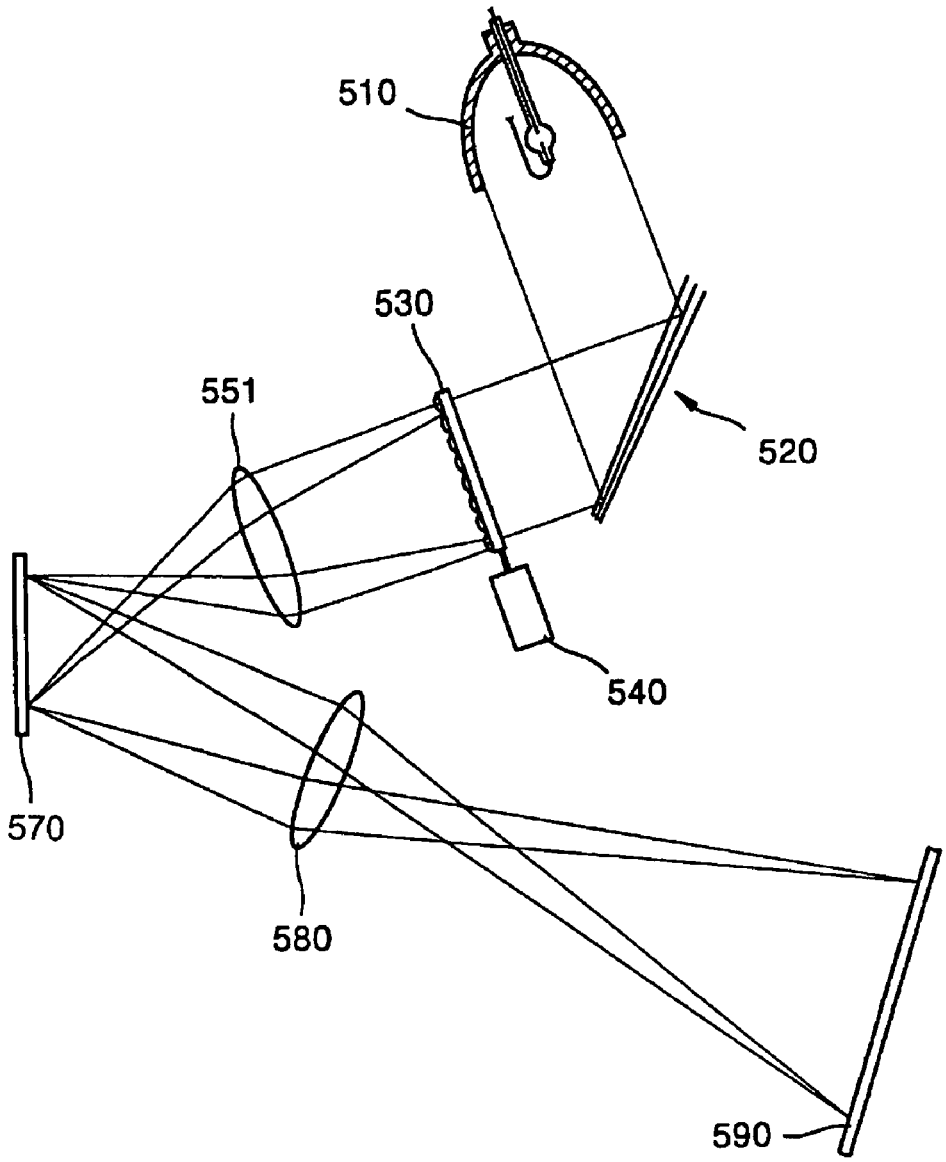
FIG. 20 is a schematic diagram illustrating an optical layout of a projection-type image display apparatus according to yet another embodiment of the present invention.

Referring to FIG. 20, a projection-type image display apparatus according to another embodiment of the present invention comprises a light source 510, a color separation unit 520, a lens array 530 dividing the beams separated by the color separation unit 520 into a predetermined number of pixel rays, a driving portion 540 driving the lens array 530, a relay lens 551 converging the rays having passed through the lens array 530, a reflection-type display device 570 transforming the rays having passed through the relay lens 551 into color-imaged rays, and reflects the color-imaged rays in a direction different from the direction of incident rays, and a projection lens unit 580 for magnifying and projecting an image onto a screen 590.

The projection-type image display apparatus according to this embodiment is characterized in that the rays reflected from the reflection-type display device 570 and forming an image are directed in a direction different from the direction of incident rays so that the proceeding path of the incident rays can be changed. Therefore, there is an advantage in that a polarizing beam splitter changing the proceeding path of an incident ray depending on a direction of polarization of the incident ray can be excluded. To this end, it is preferable that the reflection-type display device 570 is a digital micro-mirror device in which micro-mirrors corresponding to respective pixels are arranged in a two-dimensional array structure, and each micro-mirror changes its reflection angle according to electrostatic attraction forces in order to form an image. Here, since the light source 510, the color separation unit 520, the lens array 530, the driving portion 540, and the projection lens unit 580 have substantially the same structures and functions as the optical members of the same names described in connection with the embodiment of FIG. 2, detailed descriptions thereof will be omitted.

Figure 21:
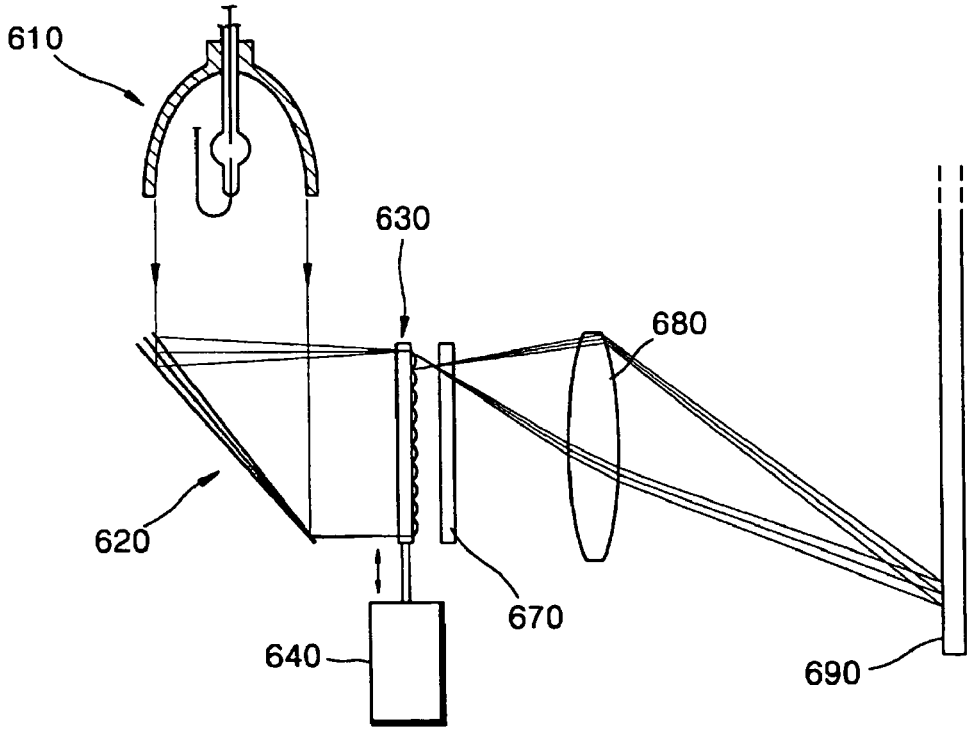
FIG. 21 is a schematic diagram illustrating an optical layout of a projection-type image display apparatus according to yet another embodiment of the present invention.

Referring to FIG. 21, a projection-type image display apparatus according to another embodiment of the present invention comprises a light source 610, a color separation unit 620, a lens array 630, a driving portion 640 driving the lens array 630, a display device 670 selectively passing color-separated rays entering from the lens array 630 to form an image, and a projection lens unit 680 magnifying and projecting the image formed by the display device 670 onto a screen 690. The display device 670 is a transmission-type display device such as a transmission-type liquid crystal display device, and the individual pixels of the display device 670 selectively pass the respective rays entering from the lens array 630 to form an image.

The projection-type image display apparatus according to this embodiment is different from the previous embodiments in the fact that the former employs the transmission-type display device 670. In this embodiment, since a polarizing beam splitter changing a proceeding path of a ray is not necessary, there is an advantage in that the configuration of an optical system is simple. In the projection-type image display apparatus according to this embodiment, the display device 670 includes a polarizer and an analyzer so that only one type of polarized beam can pass through the transmission-type display device 670. Here, since the light source 610, the color separation unit 620, the lens array 630, the driving portion 640, and the projection lens unit 680 have substantially the same structures and functions as the optical members of the same names described in connection with the embodiment of FIG. 2, detailed descriptions thereof will be omitted.

Figure 22:
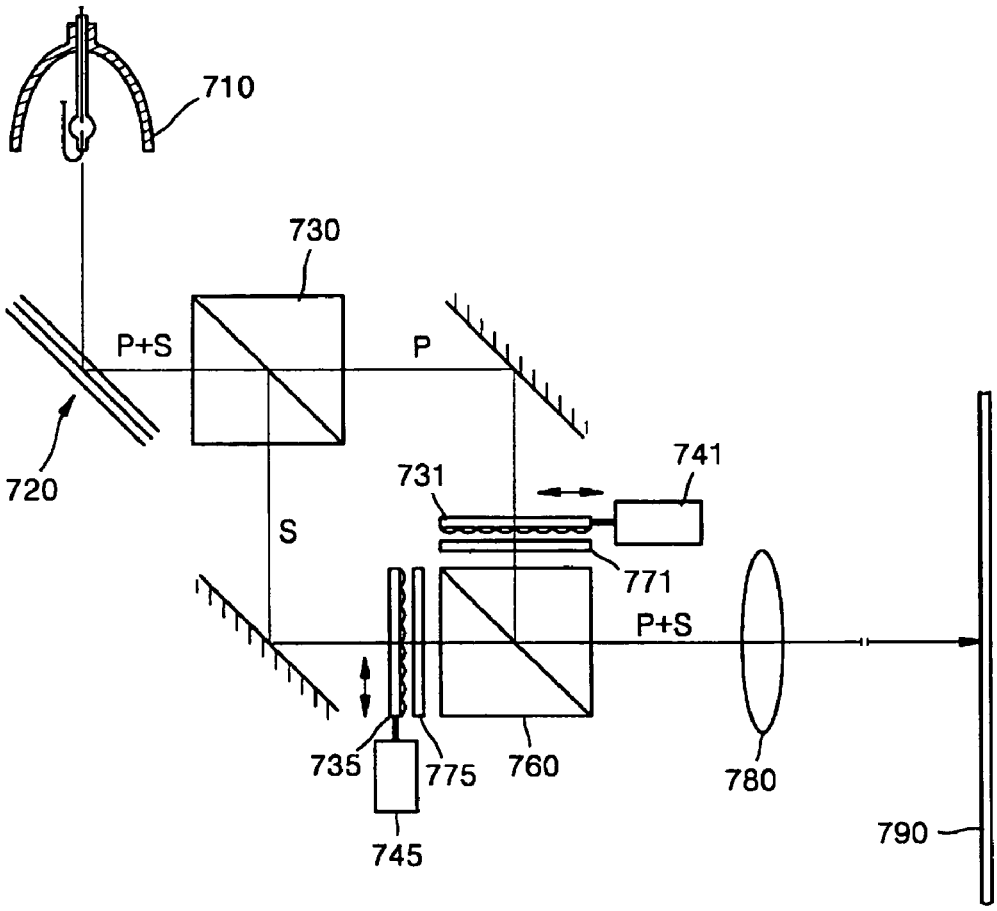
FIG. 22 is a schematic diagram illustrating an optical layout of a projection-type image display apparatus according to yet another embodiment of the present invention.

Referring to FIG. 22, a projection-type image display apparatus according to another embodiment of the present invention comprises a light source 710, a color separation unit 720, a first polarizing beam splitter 730 dividing the rays separated by the color separation unit 720 into two groups of rays directed toward first and second paths, first and second lens arrays 731 and 735 provided in the first and second paths, respectively, first and second driving portions 741 and 745 driving the first and second lens arrays 731 and 735, respectively, first and second transmission-type display devices 771 and 775 selectively passing the rays having passed through the first and second lens arrays 731 and 735, respectively, to form respective images, a second polarizing beam splitter 760 combining the images formed by the first and second display device 771 and 775 and directing the combined image to one direction, and a projection lens unit 780 magnifying and projecting the combined image onto a screen 790.

This projection-type image display apparatus is different from the projection-type image display apparatus according the previous embodiment of FIG. 21 in the fact that the former separates incident rays into first polarized rays (s-polarized rays) and second polarized rays (p-polarized rays), and is configured so that the first and second polarized rays can form respective images. The first polarizing beam splitter 730 passes the first polarized rays of the incident rays and directs the first polarized rays to the first path, and reflects the second polarized rays of the incident rays and directs the second polarized rays to the second path. The first polarized rays pass through the first lens array 731 and the first display device 771, and enter the second polarizing beam splitter 760. Meanwhile, the second polarized rays reflected from the first polarizing beam splitter 730 pass through the second lens array 735 and the second display device 775, and enter the second polarizing beam splitter 760. Here, the first display device 771 is composed of a transmission-type liquid crystal display device or the like, and the pixels of the first display device 771 are driven individually to change polarization depending on image portions and non-image portions, and produce an image.

The second polarizing beam splitter 760 changes the path of incident rays by passing or reflecting the incident rays according to a direction of polarization of the incident rays so that the image signals entering along the first and second paths can proceed toward the projection lens unit 780.

As described above, when the first and second display devices 771 and 775 are disposed in different paths, it should be understood that the efficiency of the use of light is high, and a 3-D image can be produced by driving the first and second display devices 771 and 775 to form a left-eye image and a right-eye image, respectively.

Here, since the light source 710, the color separation unit 720, and the projection lens unit 780 have substantially the same structures and functions as the optical members of the same names described in connection with the embodiment of FIG. 2, detailed descriptions thereof will be omitted. In addition, since the first and second lens arrays 731 and 735, and the first and second driving portions 741 and 745 have substantially the same structures and functions as the lens array 130 and the driving portion 140 according to the embodiment of FIG. 2, detailed descriptions thereof will be omitted.

As described above, the projection-type image display apparatus separates the rays entering from the light source into color rays using the color separation unit composed of first and second dichroic mirrors and a reflecting mirror disposed to neighbor each other. The separated rays are rearranged by the lens arrays according to their colors so that color stripes disposed in sequence and divided according to the ranges of wavelengths can enter the display devices, and the lens arrays are operated so that a full color image can be produced by each pixel. Therefore, there are advantages in that the efficiency of the use of light is high, and, in addition, a high-resolution image can be achieved.

In addition, since both p-polarized rays and s-polarized rays separated by a polarizing beam splitter are utilized in image formation, there are advantages in that the efficiency of the use of light can be enhanced, and, in addition, a 3-D image can be produced by forming left-eye and right-eye images using the separated p-polarized and s-polarized rays. In addition, when images formed by using p-polarized rays and s-polarized rays separated by a beam splitter are moved ½ the width and height of a pixel in directions orthogonal to each other, since a color image can be projected onto the screen with the area of every pixel on the screen divided into 4 equal portions, there is an advantage in that a high-resolution image can be achieved.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A projection-type image display apparatus including:

a light source emitting light rays;

a color separation unit separating the rays incident thereon according to predetermined ranges of wavelengths, and directing the separated incident rays at angles different from each other;

a lens array dividing the rays separated by the color separation unit into predetermined pixel rays and converging the pixel rays individually;

a driving portion driving the lens array to change the proceeding paths of the separated rays incident on the lens array from the color separation unit;

a polarizing beam splitter changing a proceeding path of the converged pixel rays depending on a direction of polarization by passing first polarized rays of the incident pixel rays from the lens array, and reflecting second polarized rays of the incident pixel rays from the lens array;

a reflection-type display device having pixels producing at least one color image using the first and/or second polarized rays having passed through and/or having been reflected from the polarizing beam splitter, and reflecting the color image toward the polarizing beam splitter;

a lens unit, provided in the optical path between the lens array and the display device, converging and projecting the first and second polarized rays onto the display device, said lens unit comprising:

a first converging lens provided in an optical path between the lens array and the polarizing beam splitter, converging the pixel rays having passed through the lens array; and a second converging lens provided in an optical path between the polarizing beam splitter and the display device converging incident pixel rays from the beam splitter; and a projection lens unit magnifying and projecting the color image formed by the display device and through the polarizing beam splitter onto a screen.

2. The projection-type image display apparatus as claimed in claim 1, wherein the lens array is a cylindrical lens array in which a plurality of cylindrical lenses having a width corresponding to a width of a pixel of the display device are disposed to neighbor each other.

3. The projection-type image display apparatus as claimed in claim 2, wherein the driving portion moves the lens array by a unit length which is ⅓ or less than ⅓ of a width of one of the cylindrical lens so that the separated rays of the predetermined wavelength ranges alternately enter respective pixels constituting the display device.

4. The projection-type image display apparatus as claimed in claim 1, wherein the lens unit includes:

a first converging lens provided in an optical path between the lens array and the polarizing beam splitter, converging the rays having passed through the lens array; and a second converging lens converging the rays converged by the first converging lens.

5. The projection-type image display apparatus as claimed in claim 1, wherein the display device is provided in the proceeding path of the first polarized pixel rays or the proceeding path of the second polarized pixel rays, and the rays reflected from the individual pixels of the display device forming the at least one color image are changed from one polarized state to the other polarized state, and are reflected toward the polarizing beam splitter.

6. The projection-type image display apparatus as claimed in claim 1, wherein the display device includes:

a first display device provided in the proceeding path of the first polarized pixel rays changing the rays reflected from the individual pixels thereof and forming a first color image into the second polarized rays, and reflecting the second polarized rays toward the polarizing beam splitter; and a second display device provided in the proceeding path of the second polarized pixel rays changing the rays reflected from the individual pixels thereof and forming a second color image into the first polarized rays, and reflecting the first polarized rays toward the polarizing beam splitter.

7. The projection-type image display apparatus as claimed in claim 6, wherein the first color image of the second polarized rays produced and projected by the first display device, and the second color image of the first polarized rays produced and projected by the second display device form a left-eye color image and a right-eye color image of the same image frame so that a 3-D color image can be seen when a user uses polarizing glasses.

8. The projection-type image display apparatus as claimed in claim 6, wherein the projection-type image display apparatus further includes:

a first birefringent plate provided in the optical path between the polarizing beam splitter and the first display device so that the polarized rays reflected from the first display device and forming the first color image are displaced a predetermined portion of the width of a pixel with respect to polarized rays incident thereon; and a second birefringent plate provided in the optical path between the polarizing beam splitter and the second display device so that the polarized rays reflected from the second display device and forming the second color image are displaced a predetermined portion of the height of a pixel with respect to polarized rays incident thereon.

9. The projection-type image display apparatus as claimed in claim 8, wherein the first and second display devices are disposed so that differently polarized types of rays reflected from the first and second display device each forming a color image and projected onto the screen via the polarizing beam splitter and the projection lens unit can be displaced ½ the width and height of a pixel in directions orthogonal to rays incident to the first and second display devices.

10. The projection-type image display apparatus as claimed in claim 1, wherein the color separation unit includes:

a first dichroic mirror disposed so as to reflect the rays of a first wavelength range incident thereon at a first angle with respect to the optical axis of the incident rays, and so as to pass the rays incident thereon of other wavelength ranges;

a second dichroic mirror disposed so as to reflect the rays of a second wavelength range incident thereon having passed through the first dichroic mirror at a second angle different from the first angle with respect to the optical axis of the incident rays, and so as to pass the remaining rays of a third wavelength range; and a reflecting mirror disposed so as to reflect the rays of the third wavelength range incident thereon having passed through the first and second dichroic mirrors at a third angle different from the first and second angles with respect to the optical axis of the incident rays.

11. The projection-type image display apparatus as claimed in claim 10, wherein the first, second, and third angles satisfy the following equation of inequality, the first angle>the second angle>the third angle.

12. A projection-type image display apparatus including:

a light source emitting light rays;

a color separation unit separating rays of light incident thereon according to predetermined ranges of wavelengths, and directing the separated rays at angles different from each other;

a first polarizing beam splitter reflecting first polarized rays incident thereon from the rays separated by the color separation unit to direct the first polarized rays toward a first path, and passing second polarized rays incident thereon from the rays separated by the color separation unit to direct the second polarized rays toward a second path;

first and second lens arrays provided in the first and second path, respectively, dividing the rays incident thereon separated by the color separation unit into predetermined pixel rays and converging the pixel rays individually;

first and second driving portions driving the first and second lens arrays to change the proceeding paths of the rays incident to the first and second lens arrays;

first and second transmission-type display devices selectively passing the respective rays incident thereon having passed through the first and second lens arrays to form respective color images;

a second polarizing beam splitter combining the color images formed by the first and second display devices and directing the combined color image to one path; and a projection lens unit magnifying and projecting the color image combined by the second polarizing beam splitter onto a screen to form a magnified color image on the screen.

13. The projection-type image display apparatus as claimed in claim 12, wherein the first lens array is a cylindrical lens array in which a plurality of cylindrical lenses having a width corresponding to the width of a pixel of the first display device are disposed to neighbor each other, and the second lens array is a cylindrical lens array in which a plurality of cylindrical lenses having a width corresponding to the width of a pixel of the second display device are disposed to neighbor each other.

14. The projection-type image display apparatus as claimed in claim 13, wherein the first and second driving portions move the first and second lens arrays, respectively, by a unit length which is ⅓ or less than ⅓ the width of the cylindrical lens so that the rays of predetermined wavelength ranges can alternately enter respective pixels constituting the first and second display devices.

15. The projection-type image display apparatus as claimed in claim 13, wherein the color separation unit includes:

a first dichroic mirror disposed so as to reflect the rays incident thereon of a first wavelength range at a first angle with respect to the optical axis of the incident rays, and so as to pass the rays of other wavelength ranges;

a second dichroic mirror disposed so as to reflect the rays incident thereon of a second wavelength range of the rays having passed through the first dichroic mirror at a second angle different from the first angle with respect to the optical axis of the incident rays, and so as to pass the remaining rays of a third wavelength range; and a reflecting mirror disposed so as to reflect the rays incident thereon of the third wavelength range of the rays having passed through the first and second dichroic mirrors at a third angle different from the first and second angles with respect to the optical axis of the incident rays.

16. The projection-type image display apparatus as claimed in claim 15, wherein the first, second, and third angles satisfy the following equation of inequality, the first angle>the second angle>the third angle.

17. A method of forming an image comprising:

emitting light rays;

separating the rays of light according to predetermined ranges of wavelengths and directing the separated rays at different angles;

dividing the separated rays into predetermined pixel rays and then converging the pixel rays;

separating said converged pixel rays into first and second polarized pixel rays;

producing color images using said first and second polarized pixel rays;

displacing the rays of the first color image by a width of a pixel and the rays of the second color image by a height of a pixel; and projecting and magnifying the first and second color images onto a screen.

*18. An image display system comprising:*

*a display device having pixels to produce an image;*

*a color separation unit which separates rays incident thereon according to predetermined ranges of wavelengths and directs the separated rays at corresponding different angles;*

*a lens array configured to be drivable to divide the separated rays into predetermined pixel rays corresponding to the pixels of the display device, such that a driving of the lens array causes the separated rays of the predetermined wavelength ranges to alternately enter respective pixels of the display device; and*

*a deflecting unit which variably changes an angle of refraction of an incident ray, the incident ray being incident to the deflecting unit from the display device, to displace pixels of the image in corresponding predetermined directions.*

*19. The image display system as claimed in claim 18, further comprising a driving portion which drives the lens array so as to have the separated rays of the predetermined wavelength ranges alternately enter the respective pixels of the display device.*

*20. The image display system as claimed in claim 18, wherein the display device is one of a reflection-type display device and a transmission-type display device.*

*21. The image display system as claimed in claim 18, wherein the image display system is a projection-type image display system.*

*22. An image display system comprising:*

*a display device having pixels to produce an image;*

*a color separation unit which separates rays incident thereon according to predetermined ranges of wavelengths and directs the separated rays at corresponding different angles;*

*a lens array configured to be drivable to divide the separated rays into predetermined pixel rays corresponding to the pixels of the display device, such that a driving of the lens array causes the separated rays of the predetermined wavelength ranges to alternately enter respective pixels of the display device; and*

*a deflecting unit which variably changes one of an angle of reflection of the separated rays before the lens array and an angle of refraction of an incident ray, the incident ray being incident to the deflecting unit from the display device, to displace pixels of the image in corresponding predetermined directions,*

*wherein the deflecting unit alternately displaces the pixels of the image by a ½ pixel unit.*

*23. An image display system comprising:*

*a display device having pixels to produce an image;*

*a lens array configured to be drivable to divide color separated rays into predetermined pixel rays corresponding to the pixels of the display device, such that a driving of the lens array causes the separated rays to alternately enter respective pixels of the display device; and*

*a deflecting unit which variably changes an angle of refraction of an incident ray, the incident ray being incident to the deflecting unit from the display device, to displace pixels of the image in corresponding predetermined directions,*

*wherein the deflecting unit comprises a deflecting array, which pivotably changes the angle of refraction.*

*24. An image display system comprising:*

*a display device having pixels to produce an image; and*

*a deflecting unit which variably changes an angle of refraction of a color separated incident ray, the incident ray being incident to the deflecting unit from the display device to display pixels of the image in a predetermined sequence,*

*wherein the variably changing of the deflecting unit alternately displaces the pixels of the image in corresponding predetermined directions.*

*25. The image display system as claimed in claim 24, wherein the deflecting unit alternately displaces the pixels of the image in opposite directions by a ½ pixel unit.*

*26. A method of forming an image using a display device having pixels to produce the image, the method comprising:*

*directing rays of predetermined wavelength ranges to the display device; and*

*producing the image by variably changing an angle of refraction of an incident ray, incident after modification by the display device, to displace the pixels of the image in corresponding predetermined directions,*

*wherein the variably changing of the angle of refraction displaces the rays of the predetermined wavelength ranges to alternately enter respective pixels of the display device.*

*27. An image display system comprising:*

*a display device having pixels to produce an image; and*

*a deflecting unit which variably changes an angle of reflection of a color separated light ray to the display device to display pixels of the image in a predetermined sequence,*

*wherein the variably changing of the deflecting unit alternately displaces the pixels of the image in corresponding predetermined directions,*

*wherein the variable changing of the angle of reflection of the color separated light ray is performed before a dividing of the color separated light into predetermined pixel rays corresponding to the pixels of the display device, and*

*wherein the deflecting unit alternately displaces the pixels of the image in opposite directions by a ½ pixel unit.*

*28. A method of forming an image using a display device having pixels to produce the image, the method comprising:*

*directing rays of predetermined wavelength ranges to the display device; and*

*producing the image by variably changing an angle of reflection of a light ray, of the rays of the predetermined wavelength ranges, to the display device, to displace the pixels of the image in corresponding predetermined directions,*

*wherein the variably changing of the angle of reflection displaces the rays of the predetermined wavelength ranges to alternately enter respective pixels of the display device,*

*wherein the variable changing of the angle of reflection of the light ray is performed before a dividing of the rays of the predetermined wavelength ranges into predetermined pixel rays corresponding to the pixels of the display device, and*

*wherein the deflecting unit alternately displaces the pixels of the image in opposite directions by a ½ pixel unit.*

*29. A projection-type image display apparatus including:*

*a color separation unit separating rays incident thereon according to predetermined ranges of wavelengths, and directing the separated incident rays at angles different from each other;*

*a lens array dividing the rays separated by the color separation unit into predetermined pixel rays and converging the pixel rays individually;*

*a driving portion driving the lens array to change the proceeding paths of the separated rays incident on the lens array from the color separation unit;*

*a polarizing beam splitter changing a proceeding path of the converged pixel rays depending on a direction of polarization by passing first polarized rays of the incident pixel rays from the lens array, and reflecting second polarized rays of the incident pixel rays from the lens array;*

*a reflection-type display device having pixels producing at least one color image using the first and/or second polarized rays having passed through and/or having been reflected from the polarizing beam splitter, and reflecting the color image toward the polarizing beam splitter;*

*a lens unit, provided in the optical path between the lens array and the display device, converging and projecting the first and second polarized rays onto the display device, said lens unit comprising:*

*a first converging lens provided in an optical path between the lens array and the polarizing beam splitter, converging the pixel rays having passed through the lens array; and*

*a second converging lens provided in an optical path between the polarizing beam splitter and the display device converging incident pixel rays from the beam splitter; and*

*a projection lens unit magnifying and projecting the color image formed by the display device and through the polarizing beam splitter onto a screen.*

*30. A projection-type image display apparatus including:*

*a color separation unit separating rays of light incident thereon according to predetermined ranges of wavelengths, and directing the separated rays at angles different from each other;*

*a first polarizing beam splitter reflecting first polarized rays incident thereon from the rays separated by the color separation unit to direct the first polarized rays toward a first path, and passing second polarized rays incident thereon from the rays separated by the color separation unit to direct the second polarized rays toward a second path;*

*first and second lens arrays provided in the first and second path, respectively, dividing the rays incident thereon separated by the color separation unit into predetermined pixel rays and converging the pixel rays individually;*

*first and second driving portions driving the first and second lens arrays to change the proceeding paths of the rays incident to the first and second lens arrays;*

*first and second transmission-type display devices selectively passing the respective rays incident thereon having passed through the first and second lens arrays to form respective color images;*

*a second polarizing beam splitter combining the color images formed by the first and second display devices and directing the combined color image to one path; and*

*a projection lens unit magnifying and projecting the color image combined by the second polarizing beam splitter onto a screen to form a magnified color image on the screen.*

*31. A method of forming an image comprising:*

*separating rays of light according to predetermined ranges of wavelengths and directing the separated rays at different angles;*

*dividing the separated rays into predetermined pixel rays and then converging the pixel rays;*

*separating said converged pixel rays into first and second polarized pixel rays;*

*producing color images using said first and second polarized pixel rays;*

*displacing the rays of the first color image by a width of a pixel and the rays of the second color image by a height of a pixel; and*

*projecting and magnifying the first and second color images onto a screen.*

* * * * *